United States Patent
Yan

(10) Patent No.: US 12,477,481 B2
(45) Date of Patent: Nov. 18, 2025

(54) POWER DETERMINING METHOD, APPARATUS, AND SYSTEM

(71) Applicant: HUAWEI TECHNOLOGIES CO., LTD., Guangdong (CN)

(72) Inventor: Mao Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 18/343,755

(22) Filed: Jun. 29, 2023

(65) Prior Publication Data
US 2023/0362839 A1    Nov. 9, 2023

Related U.S. Application Data

(63) Continuation of application No. PCT/CN2020/142482, filed on Dec. 31, 2020.

(51) Int. Cl.
| | |
|---|---|
| H04W 52/36 | (2009.01) |
| H04W 74/0833 | (2024.01) |
| H04W 74/0836 | (2024.01) |
| H04W 74/0838 | (2024.01) |

(52) U.S. Cl.
CPC ..... *H04W 52/367* (2013.01); *H04W 74/0833* (2013.01); *H04W 74/0836* (2024.01); *H04W 74/0838* (2024.01)

(58) Field of Classification Search
CPC ........... H04W 52/367; H04W 74/0833; H04W 74/0836; H04W 74/0838; H04W 52/42; H04W 52/325; H04W 52/362; H04W 52/146; H04W 52/50
See application file for complete search history.

(56) References Cited

U.S. PATENT DOCUMENTS

| | | | |
|---|---|---|---|
| 11,272,548 B2* | 3/2022 | Agiwal | ............ H04W 74/0836 |
| 2020/0008188 A1* | 1/2020 | Nam | ................... H04W 72/046 |
| 2020/0107369 A1 | 4/2020 | Jeon et al. | |
| 2020/0146057 A1 | 5/2020 | Jeon et al. | |

(Continued)

FOREIGN PATENT DOCUMENTS

| | | |
|---|---|---|
| WO | 2020009510 A1 | 1/2020 |
| WO | 2020020270 A1 | 1/2020 |

(Continued)

OTHER PUBLICATIONS

Zou, Jun, et al. "Packet-based preamble design for random access in massive IoT communication systems." IEEE Access 5 (2017): 11759-11767. (Year: 2017).*

(Continued)

*Primary Examiner* — Sharad Rampuria

(57) ABSTRACT

Embodiments of this application provide a power determining method, an apparatus, and a system, to resolve a problem of how to determine transmit power of sending a plurality of random access preambles. The method includes: determining first transmit power of N random access preambles to be sent to a network device, where the first transmit power is related to a quantity N of the random access preambles, and N is an integer greater than 1; and sending the N random access preambles to the network device at the first transmit power. This application is applicable to the field of communication technologies.

14 Claims, 4 Drawing Sheets

(56) References Cited

U.S. PATENT DOCUMENTS

2020/0178185 A1  6/2020  Jeons et al.
2021/0243813 A1* 8/2021  He ..................... H04W 52/146

FOREIGN PATENT DOCUMENTS

WO    2020172777 A1   9/2020
WO    2020218894 A1   10/2020

OTHER PUBLICATIONS

3GPP TS 36.321 V16.2.0:"3rd Generation Partnership Project;Technical Specification Group Radio Access Network; Evolved Universal Terrestrial Radio Access (E-UTRA);Medium Access Control (MAC) protocol specification(Release 16)",Sep. 2020,total 141 pages.
3GPP TS 38.213 V16.3.0:"3rd Generation Partnership Project; Technical Specification Group Radio Access Network; NR; Physical layer procedures for control (Release 16)",Sep. 2020,total 179 pages.
3GPP TS 38.321 V16.2.1 (Sep. 2020), 3rd Generation Partnership Project; Technical Specification Group Radio Access Network; NR; Medium Access Control (MAC) protocol specification (Release 16), 154 pages.
3GPP TS 36.101 V16.7.0:"3rd Generation Partnership Project;Technical Specification Group Radio Access Network; Evolved Universal Terrestrial Radio Access (E-UTRA);User Equipment (UE) radio transmission and reception(Release 16)",Sep. 2020,total 2042 pages.
3GPP TS 36.213 V16.3.0:"3rd Generation Partnership Project;Technical Specification Group Radio Access Network; Evolved Universal Terrestrial Radio Access (E-UTRA);Physical layer procedures(Release 16)",Sep. 2020, total 577 pages.

* cited by examiner

POWER DETERMINING METHOD, APPARATUS, AND SYSTEM

CROSS-REFERENCE TO RELATED APPLICATIONS

This application is a continuation of International Application No. PCT/CN2020/142482, filed on Dec. 31, 2020, the disclosure of which is hereby incorporated by reference in its entirety.

TECHNICAL FIELD

This application relates to the field of communication technologies, and in particular, to a power determining method, an apparatus, and a system.

BACKGROUND

In a current technology, a terminal device achieves downlink synchronization with a cell after a cell search process. Therefore, the terminal device may receive downlink data. However, the terminal device can perform uplink transmission only when achieving uplink synchronization with the cell. Currently, the terminal device establishes a connection to the cell and achieves uplink synchronization by using a random access procedure. In the random access procedure, the terminal device sends a random access preamble to a network device on a determined physical random access channel (PRACH) resource, and after sending the random access preamble, the terminal device attempts to receive a random access response (RAR) corresponding to the random access preamble from the network device.

In a long term evolution (LTE) system, a manner of determining transmit power of the random access preamble when the terminal device sends only one random access preamble before receiving the RAR is provided. However, a current new radio (NR) system supports a scenario in which the terminal device sends a plurality of random access preambles on a same random access channel occasion (RO) or different ROs before receiving the RAR. In this case, how to determine transmit power of the random access preamble is currently an urgent problem to be resolved.

SUMMARY

Embodiments of this application provide a power determining method, an apparatus, and a system, to resolve a problem of how to determine transmit power of a plurality of random access preambles.

To achieve the foregoing objective, the following technical solutions are used in the embodiments of this application.

According to a first aspect, a power determining method is provided. A communication apparatus that performs the method may be a terminal device, or may be a module, for example, a chip, used in a terminal device. The following uses an example in which an execution body is the terminal device for description. The terminal device determines first transmit power of N random access preambles to be sent to a network device, where the first transmit power is related to a quantity N of the random access preambles, and N is an integer greater than 1. Then, the terminal device sends the N random access preambles to the network device at the first transmit power. Based on the power determining method provided in this embodiment of this application, a method for determining transmit power of random access preambles when the terminal device sends a plurality of random access preambles in a random access procedure is provided. This resolves the problem of how to determine transmit power of sending a plurality of random access preambles.

With reference to the first aspect, in a possible design, that the first transmit power is related to a quantity N of the random access preambles includes: The first transmit power is related to a power offset $\Delta(N)$ determined based on the quantity N of the random access preambles. Based on the power determining method provided in this embodiment of this application, the first transmit power is related to $\Delta(N)$, so that the method for determining transmit power of random access preambles when the terminal device sends a plurality of random access preambles in a random access procedure is provided, and random access performance is improved. This resolves the problem of how to determine the transmit power of sending a plurality of random access preambles. For specific technical effect analysis, refer to subsequent method embodiments. Details are not described herein again.

With reference to the first aspect, in a possible design, the first transmit power satisfies the following relationship: $P_{PRACH,b,f,c}(i) = \min\{P_{CMAX,f,c}(i), P_{PRACH,target,f,c} + \Delta(N) + PL_{b,f,c}\}$ [dbm], where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship: $P_{PRACH,target,f,c}$=preambleReceivedTargetPower+DELTA_PREAMBLE+(PREAMBLE_POWER_RAMPNG_COUNTER−1)×PREAMBLE_POWER_RAMPING_STEP+POWER_OFFSET_2STEP_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; and POWER_OFFSET_2STEP_RA represents a power difference between two-step random access and four-step random access. Based on the power determining method provided in this embodiment of this application, the method for determining transmit power of random access preambles when the terminal device sends a plurality of random access preambles in a random access procedure is provided. This resolves the problem of how to determine transmit power of sending a plurality of random access preambles. For specific technical effect analysis, refer to subsequent method embodiments. Details are not described herein again.

With reference to the first aspect, in a possible design, the first transmit power satisfies the following relationship: $P_{PRACH,b,f,c}(i) = \min\{P_{CMAX,f,c}(i), P_{PRACH,target,f,c} + PL_{b,f,c}\}$ [dbm], where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship: $P_{PRACH,target,f,c}$=preambleReceivedTargetPower+$\Delta(N)$+DELTA_PREAMBLE+(PREAMBLE_POWER_RAMPING_COUNTER−1)×PREAMBLE_POWER_RAMPING_STEP+POWER_OFFSET_2STEP_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; and POWER_OFFSET_2STEP_RA represents a power difference between two-step random access and four-step random access. Based on the power determining method provided in this embodiment of this application, the method for determining transmit power of random access preambles when the terminal device sends a plurality of random access preambles in a random access procedure is provided. This resolves the problem of how to determine transmit power of sending a plurality of random access preambles. For specific technical effect analysis, refer to subsequent method embodiments. Details are not described herein again.

With reference to the first aspect, in a possible design, the first transmit power satisfies the following relationship: $P_{PRACH,b,f,c}(i)=\min\{P_{CMAX,f,c}(i), P_{PRACH,target,f,c}+PL_{b,f,c}\}$ [dbm], where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship:

$P_{PRACH,target,f,c}$=preambleReceivedTargetPower+DELTA_PREAMBLE+(PREAMBLE_POWER_RAMRPNG_COUNTER−1)×(PREAMBLE_POWER_RAMPING_STEP+Δ(N))+POWER_OFFSET_2STEP_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; and POWER_OFFSET_2STEP_RA represents a power difference between two-step random access and four-step random access. Based on the power determining method provided in this embodiment of this application, the method for determining transmit power of random access preambles when the terminal device sends a plurality of random access preambles in a random access procedure is provided. This resolves the problem of how to determine transmit power of sending a plurality of random access preambles. For specific technical effect analysis, refer to subsequent method embodiments. Details are not described herein again.

With reference to the first aspect, in a possible design, the first transmit power satisfies the following relationship: $P_{PRACH,b,f,c}(i)=\min\{P+P_{PRACH,target,f,c}+PL_{b,f,c}\}$ [dbm] where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship:

$P_{PRACH,target,f,c}$=preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; POWER_OFFSET_2STEP_RA represents a power difference between two-step random access and four-step random access; and DELTA_PREAMBLE is related to Δ(N). Based on the power determining method provided in this embodiment of this application, the method for determining transmit power of random access preambles when the terminal device sends a plurality of random access preambles in a random access procedure is provided. This resolves the problem of how to determine transmit power of sending a plurality of random access preambles. For specific technical effect analysis, refer to subsequent method embodiments. Details are not described herein again.

With reference to the first aspect, in a possible design, that the first transmit power is related to a quantity N of the random access preambles includes: The first transmit power is related to POWER_OFFSET_MULTI_RA, where POWER_OFFSET_MULTI_RA is related to N. Based on the power determining method provided in this embodiment of this application, the first transmit power is associated with POWER_OFFSET_MULTI_RA, and POWER_OFFSET_MULTI_RA is related to N, so that the method for determining transmit power of random access preambles when the terminal device sends a plurality of random access preambles in a random access procedure is provided. This resolves the problem of how to determine the transmit power of sending a plurality of random access preambles. For specific technical effect analysis, refer to subsequent method embodiments. Details are not described herein again.

With reference to the first aspect, in a possible design, the first transmit power satisfies the following relationship: $P_{PRACH,b,f,c}(i)=\min\{P_{CMAX,f,c}(i),P_{PRACH,target,f,c}+\Delta(N)+PL_{b,f,c}\}$ [dbm], where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship: $P_{PRACH,target,f,c}$=preambleReceivedTargetPower+DELTA_PREAMBLE+(PREAMBLE_POWER_RAMPING_COUNTER−1)×PREAMBLE_POWER_RAMPING_STEP+POWER_OFFSET_MULTI_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; and POWER_OFFSET_MULTI_RA represents a power difference between random access of the N random access preambles and random access of a single random access preamble. Based on the power determining method provided in this embodiment of this application, the method for determining transmit power of random access preambles when the terminal device sends a plurality of random access preambles in a random access procedure is provided. This resolves the problem of how to determine the transmit power of sending a plurality of random access preambles. For specific technical effect analysis, refer to subsequent method embodiments. Details are not described herein again.

With reference to the first aspect, in a possible design, the first transmit power satisfies the following relationship: $P_{PRACH,b,f,c}(i)=\min\{P_{CMAX,f,c}(i), P_{PRACH,target,f,c}+\Delta(N)+PL_{b,f,c}\}$ [dbm], where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship: $P_{PRACH,target,f,c}$=preambleReceivedTargetPower+DEL- TA_PREAMBLE+(PREAMBLE_POWER_RAMPING_COUNTER−1)×PREAMBLE_POWER_RAMPING_STEP+POWER_OFFSET_2STEP_RA+POWER_OFFSET_MULTI_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; POWER_OFFSET_2STEP_RA represents a power difference between two-step random access and four-step random access; and POWER_OFFSET_MULTI_RA represents a power difference between random access of the N random access preambles and random access of a single random access preamble. Based on the power determining method provided in this embodiment of this application, the method for determining transmit power of random access preambles when the terminal device sends a plurality of random access preambles in a random access procedure is provided. This resolves the problem of how to determine the transmit power of sending a plurality of random access preambles. For specific technical effect analysis, refer to subsequent method embodiments. Details are not described herein again.

With reference to the first aspect, in a possible design, the power offset Δ(N) determined based on the quantity N of the random access preambles satisfies the following relationship: $\Delta(N)=10\log_{10}(N)$, where $\log_{10}(N)$ represents a logarithm of N to base 10; $\Delta(N)=\lfloor 10\log_{10}(N)\rfloor$, where $\lfloor\ \rfloor$ represents rounding down; $\Delta(N)=\lceil 10\log_{10}(N)\rceil$, where $\lceil\ \rceil$ represents rounding up; $\Delta(N)=\text{round}(10\log_{10}(N))$, where round represents rounding off; $\Delta(N)=-10\log_{10}(N)$; $\Delta(N)=-\lfloor 10\log_{10}(N)\rfloor$, where $\lfloor\ \rfloor$ represents rounding down; $\Delta(N)=-\lceil 10\log_{10}(N)\rceil$, where $\lceil\ \rceil$ represents rounding up; or $\Delta(N)=-\text{round}(10\log_{10}(N))$, where round represents rounding off. Based on the power determining method provided in this embodiment of this application, the transmit power corresponding to the random access preamble can be increased or reduced, so that interference in the random access procedure is reduced, and the random access performance is improved.

With reference to the first aspect, in a possible design, the first transmit power is related to a sending manner of the N random access preambles. Based on the method provided in this embodiment of this application, the first transmit power is associated with the sending manner of the random access preamble, so that the first transmit power is calculated more flexibly.

With reference to the first aspect, in a possible design, the sending manner of the N random access preambles includes: The N random access preambles correspond to a same RO; the N random access preambles correspond to a same random access time domain resource and different random access frequency domain resources; or the N random access preambles correspond to different random access time domain resources. Based on the power determining method provided in this embodiment of this application, sending manners of the N random access preambles are classified, so that the sending manners of the random access preambles are more diversified, and can be applicable to different random access cases.

With reference to the first aspect, in a possible design, the N random access preambles are sent from different antenna ports or antenna panels; the N random access preambles are associated with a plurality of synchronization signal blocks (SSBs) and/or channel state information-reference signals (CSI-RSs); or the N random access preambles are quasi co-located (QCLed) with a plurality of SSBs and/or CSI-RSs. Based on the power determining method provided in this embodiment of this application, the sending manners of the N random access preambles can be classified physically, and may be applicable to different cases in which random access preambles are sent physically, and an application scope is wider.

According to a second aspect, a power determining method is provided. A communication apparatus that performs the method may be a terminal device, or may be a module, for example, a chip, used in a terminal device. The following uses an example in which an execution body is the terminal device for description. The terminal device determines first transmit power of N random access preambles to be sent to a network device, where the first transmit power is related to a transmit power parameter corresponding to the N random access preambles, and N is an integer greater than 1; and the terminal device sends the N random access preambles to the network device at the first transmit power. Based on the power determining method provided in this embodiment of this application, transmit power of sending the N random access preambles is associated with the transmit power parameter corresponding to the N random access preambles, and a method for determining transmit power corresponding to a plurality of random access preambles is provided. This resolves a problem of how to determine the transmit power of sending a plurality of random access preambles.

With reference to the second aspect, in a possible design, the transmit power parameter corresponding to the N random access preambles includes at least one of the following: a quantity of preamble power ramping times corresponding to the N random access preambles; a quantity of preamble transmission times corresponding to the N random access preambles; initial preamble received target power corresponding to the N random access preambles; a preamble power ramping step corresponding to the N random access preambles; or a difference between a power ramping step corresponding to the N random access preambles and a power ramping step corresponding to a single random access preamble. Based on the power determining method provided in this embodiment of this application, a physical meaning of the transmit power parameter corresponding to the N random access preambles is provided. Therefore, the first transmit power can be determined based on the transmit power parameter corresponding to the N random access preambles. This resolves the problem of how to determine the transmit power of sending a plurality of random access preambles. For specific technical effect analysis, refer to subsequent method embodiments. Details are not described herein again.

With reference to the second aspect, in a possible design, each time the N random access preambles are sent, the quantity of preamble power ramping times corresponding to the N random access preambles is increased by X1, where X1 is a positive integer greater than 1; or the quantity of preamble power ramping times corresponding to the N random access preambles is related to a sending manner of the N random access preambles. Based on the power determining method provided in this embodiment of this application, an adjustment amount of a quantity of preamble power ramping times corresponding to the N random access preambles is provided, and is different from an adjustment amount of a quantity of preamble power ramping times corresponding to a single random access preamble. This resolves the problem of how to determine the transmit power of sending a plurality of random access preambles. For specific technical effect analysis, refer to subsequent method embodiments. Details are not described herein again.

With reference to the second aspect, in a possible design, that the quantity of preamble power ramping times corresponding to the N random access preambles is related to a sending manner of the N random access preambles includes: Each time the N random access preambles are sent in a first manner, the quantity of preamble power ramping times corresponding to the N random access preambles is increased by X2; and each time the N random access preambles are sent in a second manner, the quantity of preamble power ramping times corresponding to the N random access preambles is increased by 1, where X2 is a positive integer greater than 1. Based on the power determining method provided in this embodiment of this application, different adjustment amounts when the preamble power ramping times corresponding to the N random access preambles are related to the sending manner of the random access preambles are provided. In other words, different sending manners of the random access preambles correspond to different first transmit power, so that the first transmit power is calculated more flexibly.

With reference to the second aspect, in a possible design, the first manner includes: The N random access preambles correspond to a same random access channel occasion (RO); or the N random access preambles correspond to a same random access time domain resource and different random access frequency domain resources; and the second manner includes: the N random access preambles correspond to different random access time domain resources; or the first manner includes: the N random access preambles correspond to different random access time domain resources; and the second manner includes: the N random access preambles correspond to a same RO; or the N random access preambles correspond to a same random access time domain resource and different random access frequency domain resources. Based on the power determining method provided in this embodiment of this application, sending manners of the N random access preambles are classified, so that the sending manners of the random access preambles are more diversified, and can be applicable to different random access cases.

With reference to the second aspect, in a possible design, the first transmit power is related to the sending manner of the N random access preambles. Based on the method provided in this embodiment of this application, the first transmit power is associated with the sending manner of the random access preamble, so that the first transmit power is calculated more flexibly.

With reference to the second aspect, in a possible design, the sending manner of the N random access preambles includes:

The N random access preambles correspond to a same RO; the N random access preambles correspond to a same random access time domain resource and different random access frequency domain resources; or the N random access preambles correspond to different random access time domain resources. Based on the power determining method provided in this embodiment of this application, sending manners of the N random access preambles are classified, so that the sending manners of the random access preambles are more diversified, and can be applicable to different random access cases.

With reference to the second aspect, in a possible design, the N random access preambles are sent from different antenna ports or antenna panels; the N random access preambles are associated with a plurality of synchronization signal blocks (SSBs) and/or channel state information-reference signals (CSI-RSs); or the N random access preambles are quasi co-located (QCLed) with a plurality of SSBs and/or CSI-RSs. Based on the power determining method provided in this embodiment of this application, the sending manners of the N random access preambles can be classified physically, and may be applicable to different cases in which random access preambles are sent physically, and an application scope is wider.

According to a third aspect, a random access method is provided. A communication apparatus that performs the method may be a terminal device, or may be a module, for example, a chip, used in a terminal device. The following uses an example in which an execution body is the terminal device for description. A terminal device is configured to: determine first transmit power of N random access preambles to be sent to a network device, and send the N random access preambles to the network device at the first transmit power, where the first transmit power is determined based on preamble received target power, the preamble received target power is related to two adjacent random access types, and N is an integer greater than 1. Based on the power determining method provided in this embodiment of this application, the transmit power of the N random access preambles is determined based on the preamble received target power related to the two adjacent random access types, and a method for determining transmit power of random access preambles when a terminal device sends a plurality of random access preambles in a random access procedure is provided. Therefore, a problem of how to determine the transmit power of sending the plurality of random access preambles is resolved.

With reference to the third aspect, in a possible design, the random access type includes N random access preamble types or a single random access preamble type, where N is an integer greater than 1. Based on the power determining method provided in this embodiment of this application, a random access type classification method is provided, so that a problem of how to determine preamble received target power when the terminal device switches the random access type is resolved.

According to a fourth aspect, a communication apparatus is provided to implement the foregoing methods. The communication apparatus includes a corresponding module, unit, or means (means) for implementing the foregoing methods. The module, unit, or means may be implemented by hardware, software, or hardware executing corresponding software. The hardware or the software includes one or more modules or units corresponding to the foregoing functions.

With reference to the fourth aspect, in a possible implementation, the communication apparatus includes a processing module and a transceiver module. The processing module is configured to determine first transmit power of N random access preambles to be sent to a network device, where the first transmit power is related to a quantity N of the random access preambles, and N is an integer greater than 1.

The transceiver module is configured to send the N random access preambles to the network device at the first transmit power.

With reference to the fourth aspect, in a possible implementation, the processing module may be a processor, and the transceiver module may be a transceiver.

With reference to the fourth aspect, in a possible design, that the first transmit power is related to a quantity N of the random access preambles includes: The first transmit power is related to a power offset $\Delta(N)$ determined based on the quantity N of the random access preambles.

With reference to the fourth aspect, in a possible design, the first transmit power satisfies the following relationship: $P_{PRACH,b,f,c}(i)=\min\{P_{CMAX,f,c}(i), P_{PRACH,target,f,c}+\Delta(N)+PL_{b,f,c}\}$ [dbm], where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship: $P_{PRACH,target,f,c}$=preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; and POWER_OFFSET_2STEP_RA represents a power difference between two-step random access and four-step random access.

With reference to the fourth aspect, in a possible design, the first transmit power satisfies the following relationship: $P_{PRACH,b,f,c}(i)=\min\{P_{CMAX,f,c}(i), P_{PRACH,target,f,c}+PL_{b,f,c}\}$ [dbm], where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship: $P_{PRACH,target,f,c}$=preambleReceivedTargetPower+$\Delta(N)$+DELTA_PREAMBLE+(PREAMBLE_POWER_RAMPING_COUNTER−1)×PREAMBLE_POWER_RAMPING_STEP+POWER_OFFSET_2STEP_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; and POWER_OFFSET_2STEP_RA represents a power difference between two-step random access and four-step random access.

With reference to the fourth aspect, in a possible design, the first transmit power satisfies the following relationship: $P_{PRACH,b,f,c}(i)=\min\{P_{CMAX,f,c}(i), P_{PRACH,target,f,c}+PL_{b,f,c}\}$ [dbm], where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship:

$P_{PRACH,target,f,c}$=preambleReceivedTargetPower+DELTA_PREAMBLE+(PREAMBLE_POWER_RAMPING_COUNTER−1)×(PREAMBLE_POWER_RAMPING_STEP+$\Delta(N)$)+POWER_OFFSET_2STEP_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; and POWER_OFFSET_2STEP_RA represents a power difference between two-step random access and four-step random access.

With reference to the fourth aspect, in a possible design, the first transmit power satisfies the following relationship: $P_{PRACH,b,f,c}(i)=\min\{P_{CMAX,f,c}(i), P_{PRACH,b,f,c}+PL_{b,f,c}\}$ [dbm], where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship:

$P_{PRACH,target,f,c}$=preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; POWER_OFFSET_2STEP_RA represents a power difference between two-step random access and four-step random access; and DELTA_PREAMBLE is related to $\Delta(N)$.

With reference to the fourth aspect, in a possible design, that the first transmit power is related to a quantity N of the random access preambles includes: The first transmit power is related to POWER_OFFSET_MULTI_RA, where POWER_OFFSET_MULTI_RA is related to N.

With reference to the fourth aspect, in a possible design, the first transmit power satisfies the following relationship: $P_{PRACH,b,f,c}(i)=\min\{P_{CMAX,f,c}(i), P_{PRACH,target,f,c}+\Delta(N)+PL_{b,f,c}\}$ [dbm], where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship: $P_{PRACH,target,f,c}$=preambleReceivedTargetPower+DELTA_PREAMBLE+(PREAMBLE_POWER_RAMPING_COUNTER−1)×PREAMBLE_POWER_RAMPING_STEP+POWER_OFFSET_MULTI_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; and POWER_OFFSET_MULTI_RA represents a power difference between random access of the N random access preambles and random access of a single random access preamble.

With reference to the fourth aspect, in a possible design, the first transmit power satisfies the following relationship: $P_{PRACH,b,f,c}(i)=\min\{P_{CMAX,f,c}(i), P_{PRACH,target,f,c}+\Delta(N)+PL_{b,f,c}\}$ [dbm], where $P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship: $P_{PRACH,target,f,c}$=preambleReceivedTargetPower+DELTA_PREAMBLE+(PREAMBLE_POWER_RAMPNG_COUNTER−1)×PREAMBLE_POWER_RAMPING_STEP+POWER_OFFSET_2STEP_RA+

POWER_OFFSET_MULTI_RA, where preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; POWER_OFFSET_2STEP_RA represents a power difference between two-step random access and four-step random access; and POWER_OFFSET_ MULTI_RA represents a power difference between random access of the N random access preambles and random access of a single random access preamble.

With reference to the fourth aspect, in a possible design, the power offset $\Delta(N)$ determined based on the quantity N of the random access preambles satisfies the following relationship: relationship: $\Delta(N)=10\ \log_{10}(N)$, where $\log_{10}(N)$ represents a logarithm of N to base 10; $\Delta(N)=\lfloor 10\ \log_{10}(N) \rfloor$, where $\lfloor\ \rfloor$ represents rounding down; $\Delta(N)=\lceil 10\ \log_{10}(N) \rceil$, where $\lceil\ \rceil$ represents rounding up; $\Delta(N)=\text{round}(10\ \log_{10}(N))$, where round represents rounding off; $\Delta(N)=-10\ \log_{10}(N)$; $\Delta(N)=-\lfloor 10\ \log_{10}(N) \rfloor$, where $\lfloor\ \rfloor$ represents rounding down; $\Delta(N)=-\lceil 10\ \log_{10}(N) \rceil$, where $\lceil\ \rceil$ represents rounding up; or $\Delta(N)=-\text{round}(10\ \log_{10}(N))$, where round represents rounding off.

With reference to the fourth aspect, in a possible design, the first transmit power is related to the sending manner of the N random access preambles.

With reference to the fourth aspect, in a possible design, the sending manner of the N random access preambles includes: The N random access preambles correspond to a same random access channel occasion (RO); the N random access preambles correspond to a same random access time domain resource and different random access frequency domain resources; or the N random access preambles correspond to different random access time domain resources.

With reference to the fourth aspect, in a possible design, the N random access preambles are sent from different antenna ports or antenna panels; the N random access preambles are associated with a plurality of synchronization signal blocks (SSBs) and/or channel state information-reference signals (CSI-RSs); or the N random access preambles are quasi co-located (QCLed) with a plurality of SSBs and/or CSI-RSs.

For technical effects brought by any possible implementation in the fourth aspect, refer to technical effects brought by different implementations in the first aspect. Details are not described herein again.

According to a fifth aspect, a communication apparatus is provided to implement the foregoing methods. The communication apparatus includes a corresponding module, unit, or means (means) for implementing the foregoing methods. The module, unit, or means may be implemented by hardware, software, or hardware executing corresponding software. The hardware or the software includes one or more modules or units corresponding to the foregoing functions.

With reference to the fifth aspect, in a possible implementation, the communication apparatus includes a processing module and a transceiver module. The processing module is configured to determine first transmit power of N random access preambles to be sent to a network device, where the first transmit power is related to a transmit power parameter corresponding to the N random access preambles, and N is an integer greater than 1. The transceiver module is configured to send the N random access preambles to the network device at the first transmit power.

With reference to the fifth aspect, in a possible implementation, the processing module may be a processor, and the transceiver module may be a transceiver.

With reference to the fifth aspect, in a possible design, the transmit power parameter corresponding to the N random access preambles includes at least one of the following: a quantity of preamble power ramping times corresponding to the N random access preambles; a quantity of preamble transmission times corresponding to the N random access preambles; initial preamble received target power corresponding to the N random access preambles; a preamble power ramping step corresponding to the N random access preambles; or a difference between a power ramping step corresponding to the N random access preambles and a power ramping step corresponding to a single random access preamble.

With reference to the fifth aspect, in a possible design, each time the N random access preambles are sent, the quantity of preamble power ramping times corresponding to the N random access preambles is increased by X1, where X1 is a positive integer greater than 1; or the quantity of preamble power ramping times corresponding to the N random access preambles is related to a sending manner of the N random access preambles.

With reference to the fifth aspect, in a possible design, that the quantity of preamble power ramping times corresponding to the N random access preambles is related to a sending manner of the N random access preambles includes: Each time the N random access preambles are sent in a first manner, the quantity of preamble power ramping times corresponding to the N random access preambles is increased by X2; and each time the N random access preambles are sent in a second manner, the quantity of preamble power ramping times corresponding to the N random access preambles is increased by 1, where X2 is a positive integer greater than 1.

With reference to the fifth aspect, in a possible design, the first manner includes: The N random access preambles correspond to a same random access channel occasion (RO); or the N random access preambles correspond to a same random access time domain resource and different random access frequency domain resources; and the second manner includes: the N random access preambles correspond to different random access time domain resources; or the first manner includes: the N random access preambles correspond to different random access time domain resources; and the second manner includes: the N random access preambles correspond to a same RO; or the N random access preambles correspond to a same random access time domain resource and different random access frequency domain resources.

With reference to the fifth aspect, in a possible design, the first transmit power is related to the sending manner of the N random access preambles.

With reference to the fifth aspect, in a possible design, the sending manner of the N random access preambles includes:
  the N random access preambles correspond to a same RO;
    the N random access preambles correspond to a same random access time domain resource and different random access frequency domain resources; or the N random access preambles correspond to different random access time domain resources.

With reference to the fifth aspect, in a possible design, the N random access preambles are sent from different antenna ports or antenna panels; the N random access preambles are associated with a plurality of synchronization signal blocks (SSBs) and/or channel state information-reference signals (CSI-RSs); or the N random access preambles are quasi co-located (QCLed) with a plurality of SSBs and/or CSI-RSs.

For technical effects brought by any possible implementation in the fifth aspect, refer to technical effects brought by different implementations in the second aspect. Details are not described herein again.

According to a sixth aspect, a communication apparatus is provided to implement the foregoing methods. The communication apparatus includes a corresponding module, unit, or means (means) for implementing the foregoing methods. The module, unit, or means may be implemented by hardware, software, or hardware executing corresponding software. The hardware or the software includes one or more modules or units corresponding to the foregoing functions.

With reference to the sixth aspect, in a possible implementation, the communication apparatus includes a processing module and a transceiver module. The processing module is configured to determine first transmit power of N random access preambles to be sent to a network device, where the first transmit power is determined based on preamble received target power, the preamble received target power is related to two adjacent random access types, and N is an integer greater than 1. The transceiver module is configured to send the N random access preambles to the network device at the first transmit power.

With reference to the sixth aspect, in a possible implementation, the processing module may be a processor.

With reference to the sixth aspect, in a possible design, the random access type includes N random access preamble types and a single random access preamble type, where N is an integer greater than 1.

For technical effects brought by any possible implementation in the sixth aspect, refer to technical effects brought by different implementations in the third aspect. Details are not described herein again.

According to a seventh aspect, a communication apparatus is provided. The communication apparatus includes a processor. The processor is configured to: be coupled to a memory, and after reading computer instructions stored in the memory, perform the method according to any one of the foregoing aspects based on the instructions.

With reference to the seventh aspect, in a possible implementation, the communication apparatus further includes a memory, and the memory is configured to store computer instructions.

With reference to the seventh aspect, in a possible implementation, the communication apparatus further includes a communication interface, and the communication interface is used by the communication apparatus to communicate with another device. For example, the communication interface may be a transceiver, an input/output interface, an interface circuit, an output circuit, an input circuit, a pin, a related circuit, or the like.

With reference to the seventh aspect, in a possible implementation, the communication apparatus may be a chip or a chip system. When the communication apparatus is a chip system, the communication apparatus may include a chip, or may include a chip and another discrete component.

With reference to the seventh aspect, in a possible implementation, when the communication apparatus is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to an eighth aspect, a computer-readable storage medium is provided. The computer-readable storage medium stores instructions. When the instructions are run on a computer, the computer is enabled to perform the method according to any one of the foregoing aspects.

According to a ninth aspect, a computer program product including instructions is provided. When the computer program product runs on a computer, the computer is enabled to perform the method according to any one of the foregoing aspects.

For technical effects brought by any possible implementation in the seventh aspect to the ninth aspect, refer to technical effects brought by different implementations in any aspect. Details are not described herein again.

According to a tenth aspect, a communication system is provided. The communication system includes a terminal device that performs the method according to the first aspect and a network device; or includes a terminal device that performs the method according to the second aspect and a network device; or includes a terminal device that performs the method according to the third aspect and a network device.

DESCRIPTION OF EMBODIMENTS

For ease of understanding of technical solutions in embodiments of this application, the following first briefly describes technologies related to this application.

1. Random Access (RA) Procedure:

In a current technology, a terminal device achieves downlink synchronization with a cell after a cell search process. Therefore, the terminal device may receive downlink data. However, the terminal device can perform uplink transmission only when achieving uplink synchronization with the cell. Currently, the terminal device establishes a connection to the cell and achieves uplink synchronization by using a random access procedure.

Random access can be classified into contention-based random access (CBRA) and contention-free random access (CFRA). The contention-based random access procedure is a process in which a network device does not allocate a dedicated random access preamble and/or PRACH resource to the terminal device, but the terminal device randomly selects a random access preamble within a specified range and initiates random access. The contention-free random access procedure is random access initiated by the terminal device on a specified PRACH resource by using a specified random access preamble according to an indication of the network device. The contention-based random access is usually divided into four steps, each step corresponds to one message, including a message 1 (Msg1), a message 2 (Msg2), a message 3 (Msg3), or a message 4 (Msg4), and each message carries different signaling or information. The contention-free random access includes only the first two steps corresponding to the message 1 or the message 2.

Based on different information exchange steps, random access may be classified into four-step random access (4-step RACH) and two-step random access (2-step RACH). The two-step random access combines the steps of information exchange in the four-step random access, and reduces the steps and time needed in the random access procedure compared with the four-step random access. The two-step random access includes two steps, and the two steps respectively correspond to a message A (MsgA) or a message B (MsgB). Information included in the message A is similar to information in the message 1 and the message 3, and information included in the message B is similar to information in the message 2 and the message 4.

It should be noted that the message 1, the message 2, the message 3, the message 4, the message A, and the message B in the foregoing literal record are pronouns of messages, and may be replaced with any other nouns in another scenario.

It should be noted that, because a random access procedure is carried by a random access channel (RACH), RA and RACH are usually mixed in a protocol and in oral language. This is uniformly described herein, and details are not described below again.

Figure 1:
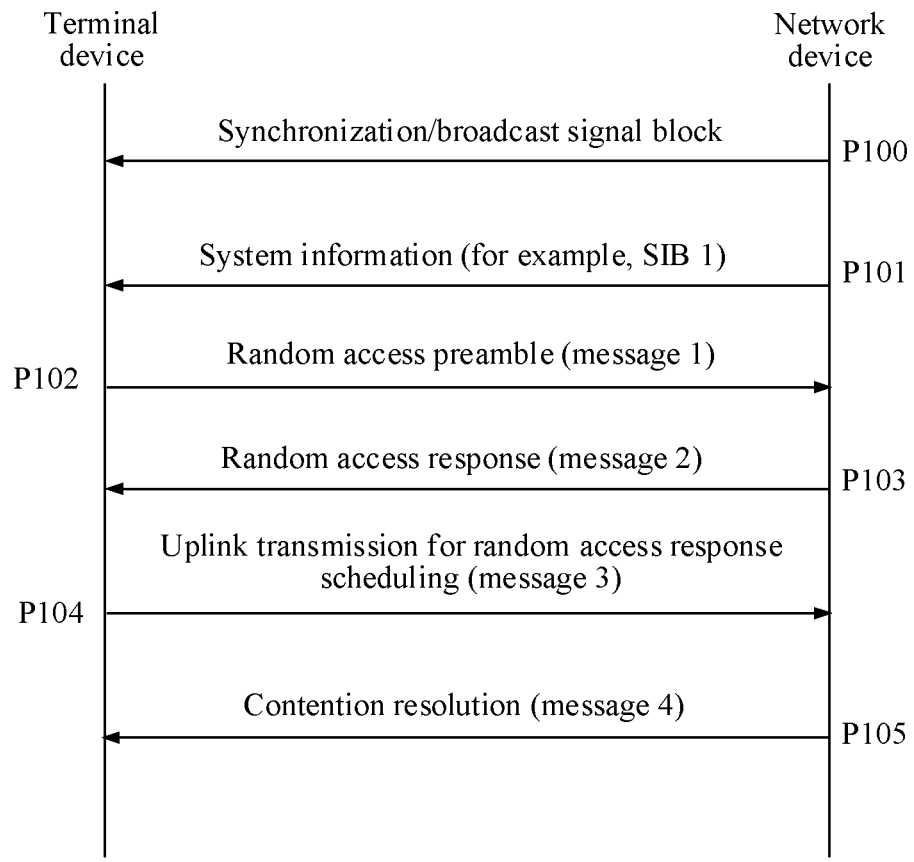
FIG. 1 is a schematic flowchart of random access according to an embodiment of this application.

The random access may be triggered by events such as initial access of the terminal device, a radio resource control (RRC) connection re-establishment process, handover (handover), synchronization reconfiguration, an RRC connection recovery process, and a beam failure. The following describes, with reference to FIG. 1, a procedure of performing initial access by using random access in an LTE/NR system. As shown in FIG. 1, the procedure mainly includes the following several steps.

P100: A network device periodically sends a synchronization signal or a reference signal at a specific position. In the NR system, the synchronization signal sent by the network device is referred to as a synchronization/broadcast signal block SS/PBCH block or SSB). The SSB includes a physical broadcast channel (physical broadcast channel), and content carried in the physical broadcast channel is referred to as a master system information block (MIB). The MIB represents a search space of a system information block 1 (SIB1). In addition, during beam handover or cell handover, the network device further sends a channel state information-reference signal (CSI-RS).

P101: A network device sends system information (system information) in a broadcast manner at a specific position, and a signal carrying the system information is also referred to as a system information block (SIB), for example, the SIB1.

After the terminal device is powered on or when the terminal device needs to re-access a network, the terminal device may scan a synchronization signal of the network device, perform downlink time and frequency synchronization, and receive configuration information that is related to a random access resource and that is in the system information.

P102: The terminal device selects, based on the random access resource configuration information in the system message and the SSB to which the terminal device is synchronized, a random access resource associated with the SSB, where the random access resource includes a time resource, a frequency resource, or a code domain resource (preamble), and the terminal device sends a random access signal (physical random access channel transmission, PRACH transmission) by using the random access resource, which is also referred to as sending a Msg1 or sending a random access preamble. A time resource and a frequency resource that carry one or more random access preambles are referred to as a random access occasion. The random access occasion is also referred to as a random access resource (RACH resource) or a random access channel occasion (RACH occasion/RACH transmission occasion/RACH opportunity/RACH chance, RO). In other words, logically, one random access occasion carries information/a signal of a PRACH. Sometimes, the random access occasion is also equivalently referred to as a physical random access channel occasion (PRACH occasion) or a physical random access channel resource (PRACH resource).

It can be learned from the foregoing descriptions that, the terminal device determines the RO based on the random access resource configuration information in the system message. Specifically, the terminal device determines an RO in time domain (a system frame, a subframe, a slot, or an OFDM symbol) based on at least one parameter such as a random access configuration index, a random access subcarrier spacing, and a frequency range. In addition, the terminal device determines a frequency position of the RO and a quantity of ROs in frequency domain based on the random access frequency configuration information, for example, parameters such as a quantity of frequency division multiplexing ROs and a start position of the RO in frequency domain.

Further, the terminal device may determine a random access preamble at the RO based on information such as a random access sequence length, a root sequence index, and a cyclic shift (zeroCorrelationZoneConfig).

In an NR system, because the SSB is associated with the random access resource, after detecting the random access preamble, the network device can obtain a downlink beam for sending a Msg2, and correspondingly, the terminal device receives the downlink beam. The downlink beam may be represented by at least one of the following parameters: a spatial filter, a sending configuration indication (transmission configuration indication/transmission configuration indicator, TCI), and an SSB resource indicator (SSBRI).

P103: After receiving the message 1 sent by the terminal device, the network device estimates a timing advance amount of the terminal device based on the random access preamble sent by the terminal device, and sends the message 2 to the terminal device, where the message 2 includes configuration information such as a time-frequency resource position and a modulation and coding scheme that are used by the terminal device to send a Msg3 for conflict resolution. The message 2 is also referred to as an RAR, and the RAR is a response of the network device to the received message 1. The RAR may be referred to as the message 2 at both a physical layer and a medium access control (MAC) layer, but is generally referred to as a response message corresponding to a specific random access preamble (for example, a random access preamble sent by a specific terminal device) at the physical layer. The RAR at the MAC layer is a combination of response messages corresponding to all random access preambles detected by the network device in a specific RO or a plurality of ROs, and is assembled in a form of a MAC data unit. To be specific, the network device usually encapsulates responses of all random access preambles detected at one RO, to form the message 2. Therefore, the message 2 may correspond to a plurality of messages 1, and includes a plurality of RARs. At least one piece of the following information is encapsulated in a single RAR: an index (random access preamble identity, RAPID) of the message 1, an uplink grant (UL grant), a timing advance (timing advance), a temporary cell-radio network temporary identifier (TC-RNTI), and the like. The terminal device identifies, by using the RAPID, whether the RAR is an RAR corresponding to the random access preamble sent by the terminal device.

Correspondingly, after sending the message 1, the terminal device searches the received message 2 for an RAR corresponding to the random access preamble sent by the terminal device, and ignores an RAR corresponding to another random access preamble.

The terminal device attempts to detect the message 2 in an RAR receive window. It should be noted that a physical downlink control channel (PDCCH) search space corresponding to the message 2 or a Msg4 in P105 is configured in the system message in P101. If the search space is not configured in the system message, the search space is the same as a search space or control resource set (CORESET) corresponding to the SIB1 in P100.

Specifically, a time point at which the network device may send the message 2 is determined by the RAR receive window. The RAR receive window starts from an orthogonal frequency division multiplexing (OFDM) symbol, in which an earliest CORESET is located, in a search space in which a PDCCH corresponding to the message 2 is located. A length of the RAR receive window is configured by using a higher layer field ra-ResponseWindow delivered by the network device, and is in a unit of a slot corresponding to a subcarrier spacing of the PDCCH corresponding to the message 2. The length of the RAR receive window does not exceed 10 ms.

P104: After receiving the message 2, the terminal device sends a message 3 on a corresponding time-frequency resource based on a configuration in the message 2. The message 3 is also referred to as first uplink scheduling transmission, and is transmission scheduled by using a UL grant in the message 2, or is retransmission scheduled by using downlink control information (DCI) scrambled by using a TC-RNTI. Content transmitted by using the Msg3 is a higher-layer message, for example, a connection setup request message (which may be specifically identification information of a user initiating a connection request). A function of the message 3 is contention resolution. If a plurality of different devices use a same random access preamble for random access, whether a conflict exists may be determined by using both the message 3 and the message 4. In the protocol, the message 3 is defined as a part of the random access procedure and is transmitted on an uplink shared channel (UL-SCH), and the message 3 includes a C-RNTI MAC control element (CE) or a common control channel (CCCH) service data unit (SDU), is submitted by an upper layer, and is associated with a UE contention resolution identity (Message transmitted on UL-SCH containing a C-RNTI MAC CE or CCCH SDU, submitted from upper layer and associated with the UE Contention Resolution Identity, as part of a Random Access procedure).

P105: After receiving the message 3, the network device replies with a Msg4 to the terminal device, to indicate that the terminal user successfully accesses the network. The message 4 is used for contention resolution. The message 4 usually includes an identifier, for example, a CCCH SDU sent by the terminal device, that is of the terminal device and that is carried in the message 3. Correspondingly, if the terminal device detects, in the message 4, the CCCH SDU sent by the terminal device in the message 3, the terminal device considers that the contention-based random access succeeds, and continues to perform a subsequent communication process. The message 4 is retransmitted. To be specific, there is corresponding physical uplink control channel (PUCCH) for transmission of feedback information, and the feedback information is used to feed back whether the terminal device successfully detects the message 4. The terminal device needs to perform power control when sending the feedback information on the PUCCH.

In conclusion, in the foregoing steps, a process from sending the Msg1 to sending the Msg4 is generally referred to as a contention-based four-step random access procedure, and contention-free four-step random access includes only two steps: sending the Msg1 and sending the Msg2. In addition, if two-step random access is performed, the message A and the message B are sent. The message A includes sending of the random access preamble and a first piece of data information, which is similar to the message 1 and the message 3 in the four-step random access. The message B includes contention resolution and uplink scheduling, which is similar to the message 2 and the message 4 in the four-step random access. The Msg1, the Msg3, and the Msg4 may be retransmitted after a failure.

2. OFDM:

OFDM is a multi-carrier transmission waveform of frequency division multiplexing, and signals (also referred to as carriers/subcarriers) participating in multiplexing are orthogonal. An OFDM technology converts a high-speed data stream into a plurality of parallel low-speed data streams through serial/parallel conversion, and then allocates the low-speed data streams to several subcarriers of different frequencies for transmission. The OFDM technology uses orthogonal subcarriers, so that spectrums of the subcarriers are overlapped.

3. Transmit Power:

The transmit power is also referred to as output power. The transmit power may be defined as output power measured on all or a part of supported frequencies, frequency bands, or bandwidths within a given time period and/or periodicity. For example, given measurement time is at least 1 ms. For another example, the given measurement time is at least one slot corresponding to a subcarrier spacing. In an embodiment, the transmit power may be output power measured in at least 1 ms.

4. Subcarrier Spacing:

The subcarrier spacing is a type of a waveform parameter (numerology) in a communication system, especially an OFDM-based communication system, for example, 5G. The numerology may be defined by using one or more of the following parameter information: a subcarrier spacing, a cyclic prefix (CP), a time unit, a bandwidth, and the like. For example, the numerology may be defined by using the subcarrier spacing and the CP. CP information may include a CP length and/or a CP type. For example, the CP may be a normal CP (NCP) or an extended CP (ECP). The time unit represents a time unit in time domain, and may be, for example, a sampling point, a symbol, a mini-slot, a slot, a subframe, or a radio frame. Time unit information may include a type, a length, a structure, or the like of the time unit. As shown in Table 1, numerology is defined as follows in an existing standard [TS 38.211, Table 4.2-1: Supported transmission numerologies]: Supported transmission numerologies]:

TABLE 1

| μ | Δf = $2^\mu \cdot 15$ [kHz] | CP type |
|---|---|---|
| 0 | 15 | Normal |
| 1 | 30 | Normal |
| 2 | 60 | Normal, extended |
| 3 | 120 | Normal |
| 4 | 240 | Normal |

μ represents an index of the subcarrier spacing. For example, μ=0 indicates that the subcarrier spacing is 15 kHz.

$\Delta f = 2^\mu \cdot 15$ [kHz] indicates a calculation rule of the subcarrier spacing, where Δf represents the subcarrier spacing. For example, if μ=0, the subcarrier spacing Δf=15 kHz is obtained according to $\Delta f = 2^\mu \cdot 15$ [kHz].

The CP type represents a CP type of the numerology.

5. Reference Signal (RS):

Based on functions, reference signals are classified into a demodulation reference signal (DMRS), a channel state information-reference signal, a phase tracking reference signal (PTRS), a channel sounding reference signal (SRS), and the like. A transmit end or a receive end of the reference signal knows or may infer, according to a predetermined rule, time and frequency locations of the reference signal, and a reference signal/symbol carried in time and frequency. The reference signal is generally used for channel estimation, auxiliary signal demodulation, or detection. For example, the DMRS and the CSI-RS are used to obtain channel information, and the PTRS is used to obtain phase change information.

6. Antenna Port:

In this embodiment, the antenna port is a logical concept. One antenna port may correspond to one physical transmit antenna, or may correspond to a plurality of physical transmit antennas. From a perspective of the terminal device, regardless of whether the antenna port is formed by using a single physical sending antenna or is formed by combining a plurality of physical sending antennas, a reference signal corresponding to the antenna port defines the antenna port. Therefore, in the two cases, a receiver of the terminal device does not decompose signals from a same antenna port. Therefore, for the terminal device, one antenna port corresponds to one channel, and each antenna port corresponds to one time/frequency resource grid, and has an independent reference signal. The terminal needs to perform channel estimation and data demodulation based on the reference signal corresponding to the antenna port. For example, an antenna port corresponding to the DMRS is a DMRS port, and the terminal may obtain channel estimation of the antenna port based on the DMRS.

7. Random Access Preamble:

A random access preamble format is determined by the following five parts: a preamble sequence length, a subcarrier spacing, a cyclic prefix, a sequence time length, and a guard period (or called guard time, GT). The guard period may be replaced by a total time length of the random access preamble. In the NR protocol TS 38.211, the foregoing parameters are clearly defined.

For example, the NR defines a random access preamble format whose preamble sequence length is 839, as shown in Table 2(a) below.

TABLE 2(a)

| Random access preamble format | $L_{RA}$ | $\Delta f^{RA}$ | $N_u$ | $N_{CP}^{RA}$ | Supported restricted set (support for restricted sets) |
|---|---|---|---|---|---|
| 0 | 839 | 1.25 kHz | 24576κ | 3168κ | Type A, Type B |
| 1 | 839 | 1.25 kHz | 2 · 24576κ | 21024κ | Type A, Type B |
| 2 | 839 | 1.25 kHz | 4 · 24576κ | 4688κ | Type A, 9 Type B |
| 3 | 839 | 5 kHz | 4 · 6144κ | 3168κ | Type A, Type B |

The random access preamble format represents a format of the random access preamble, and includes four preamble formats: 0, 1, 2, and 3.

$L_{RA}$ represents the preamble sequence length, where the preamble sequence length is 839.

$\Delta f^{RA}$ represents the subcarrier spacing of the random access preamble. For example, a subcarrier spacing of a random access preamble whose random access preamble format is 0 is 1.25 kHz.

$N_u$ represents the sequence time length, which is represented by a quantity of reference time sampling points. For example, a sequence time length of the random access preamble whose random access preamble format is 0 is 24576K, where K=64, and is an expansion factor.

$N_{CP}^{RA}$ represents a cyclic prefix length of the random access preamble. For example, a cyclic prefix length of the random access preamble whose random access preamble format is 0 is 3168K.

In addition, although Table 2(a) does not show that a total time length of random access preambles corresponding to the format 0 and the format 3 is 1 ms, a difference between subcarrier spacings corresponding to the format 0 and the format 3 is four times (correspondingly, frequency domain bandwidths are respectively 1.25*864 kHz and 5*864 kHz, and a difference is four times). A total time length of a random access preamble corresponding to the format 1 is 3 ms. A total time length of a random access preamble corresponding to the format 2 is 3.5 ins.

For example, the NR defines a random access preamble format whose preamble sequence length is 139, 1151, or 571, as shown in Table 2(b) below.

TABLE 2(b)

| Random access preamble format | $L_{RA}$ μ∈ {0, 1, 2, 3} | μ = 0 | μ = 1 | $\Delta f^{RA}$ | $N_u$ | $N_{CP}^{RA}$ | Supported restricted sets | $N_{dur}^{RA}$ |
|---|---|---|---|---|---|---|---|---|
| A1 | 139 | 1151 | 571 | $15 \cdot 2^\mu$ kHz | $2 \cdot 2048\kappa \cdot 2^{-\mu}$ | $288\kappa \cdot 2^{-\mu}$ | — | 2 |
| A2 | 139 | 1151 | 571 | $15 \cdot 2^\mu$ kHz | $4 \cdot 2048\kappa \cdot 2^{-\mu}$ | $576\kappa \cdot 2^{-\mu}$ | — | 4 |
| A3 | 139 | 1151 | 571 | $15 \cdot 2^\mu$ kHz | $6 \cdot 2048\kappa \cdot 2^{-\mu}$ | $864\kappa \cdot 2^{-\mu}$ | — | 6 |

TABLE 2(b)-continued

| Random access preamble format | $L_{RA}$ | $\mu \in \{0, 1, 2, 3\}$ | $\mu = 0$ | $\mu = 1$ | $\Delta f^{RA}$ | $N_u$ | $N_{CP}^{RA}$ | Supported restricted sets | $N_{dur}^{RA}$ |
|---|---|---|---|---|---|---|---|---|---|
| B1 | 139 | | 1151 | 571 | $15 \cdot 2^\mu$ kHz | $2 \cdot 2048\kappa \cdot 2^{-\mu}$ | $216\kappa \cdot 2^{-\mu}$ | — | 2 |
| B2 | 139 | | 1151 | 571 | $15 \cdot 2^\mu$ kHz | $4 \cdot 2048\kappa \cdot 2^{-\mu}$ | $360\kappa \cdot 2^{-\mu}$ | — | 4 |
| B3 | 139 | | 1151 | 571 | $15 \cdot 2^\mu$ kHz | $6 \cdot 2048\kappa \cdot 2^{-\mu}$ | $504\kappa \cdot 2^{-\mu}$ | — | 6 |
| B4 | 139 | | 1151 | 571 | $15 \cdot 2^\mu$ kHz | $12 \cdot 2048\kappa \cdot 2^{-\mu}$ | $936\kappa \cdot 2^{-\mu}$ | — | 12 |
| C0 | 139 | | 1151 | 571 | $15 \cdot 2^\mu$ kHz | $2048\kappa \cdot 2^{-\mu}$ | $1240\kappa \cdot 2^{-\mu}$ | — | 2 |
| C2 | 139 | | 1151 | 571 | $15 \cdot 2^\mu$ kHz | $4 \cdot 2048\kappa \cdot 2^{-\mu}$ | $2048\kappa \cdot 2^{-\mu}$ | — | 6 |

Physical meanings indicated by the random access preamble format, $L_{RA}$, $\Delta f^{RA}$, $N_\mu$, $N_{CP}^{RA}$, and supported restricted table parameters in Table 2(b) are all consistent with physical meanings indicated by the parameters in Table 2(a), and details are not described herein.

In Table 2(b), $N_{dur}^{RA}$ represents the total time length of the random access preamble. For example, a total time length of a random access preamble whose random access preamble format is A1 is 2.

In addition, a time unit in Table 2(b) is $T_C = 1/(\Delta f_{max} \cdot N_f)$, where $\Delta f_{max} = 480 \cdot 10^3$ Hz, $N_f = 4096$ Hz, and $\Delta f_{max}$ and $N_f$ are two reference fixed values, and have no physical meaning.

In Table 2(b), the random access preamble whose random access preamble sequence length is 139, 1151, or 571 is suitable for a larger subcarrier spacing, and correspondingly, there are nine random access preamble formats: A1, A2, A3, B1, B2, B3, B4, C0, and C2, which are respectively obtained by repeating different quantities of preamble OFDM symbols (namely, the column $N_u$ in Table 2(b)). A random access preamble whose preamble sequence length is 1151 or 571 is mainly designed for an unlicensed frequency spectrum, and occupies a large bandwidth. It can be learned from Table 2(b) that, for a random access preamble whose random access preamble sequence length is 1151, a corresponding $\mu=0$, that is, the random access preamble is supported only when the subcarrier spacing is 15 kHz. For a random access preamble whose random access preamble sequence length is 571, a corresponding $\mu=1$, that is, the random access preamble is supported only when the subcarrier spacing is 30 kHz. For a random access preamble whose random access sequence length is 139, a corresponding $\mu \in \{0, 1, 2, 3\}$, that is, the random access preamble is supported when the subcarrier spacing is 15 kHz, 30 kHz, 60 kHz, or 120 kHz. The subcarrier spacings of 15 kHz and 30 kHz are used only in a scenario in which a carrier frequency is low, for example, in a frequency range corresponding to a frequency range (FR) FR1 in Table 3. The subcarrier spacings of 60 kHz and 120 kHz are used only in a scenario in which a carrier frequency is high, for example, in a frequency range corresponding to an FR2 in Table 3

TABLE 3

| Frequency range name | Corresponding frequency range |
|---|---|
| FR1 | 410 MHz to 7125 MHz |
| FR2 | 24250 MHz to 52600 MHZ |

In Table 3, different frequency range names (Frequency range designations) have corresponding frequency ranges (Corresponding frequency ranges). For example, the FR1 corresponds to the frequency of 410 MHz to 7125 MHz.

Random access preamble formats in Table 2(a) are classified into three types: A, B, and C, which are respectively used in different scenarios. Random access preambles corresponding to the formats A1, A2, and A3 are respectively the same as $N_u$ (also referred to as absolute time lengths) of random access preambles corresponding to the formats B1, B2, or B3. However, $N_{CP}^{RA}$ corresponding to two types of random access preamble formats is different, and a random access preamble corresponding to the format B1, B2, or B3 implicitly include GT, for example, GT of a random access preamble corresponding to the format A1, A2, or A3 is one OFDM symbol or zero OFDM symbol, and GT of a random access preamble corresponding to the format B1, B2, B3, B4, C0, or C2 is $GT = N_{dur}^{RA}(144+2048) \kappa \cdot 2^{-\mu} - N_u - N_{CP}^{RA}$ or $GT = (N_{dur}^{RA}(144+2048) + 16) \kappa \cdot 2^{-\mu} - N_u - N_{CP}^{RA}$.

Figure 2:
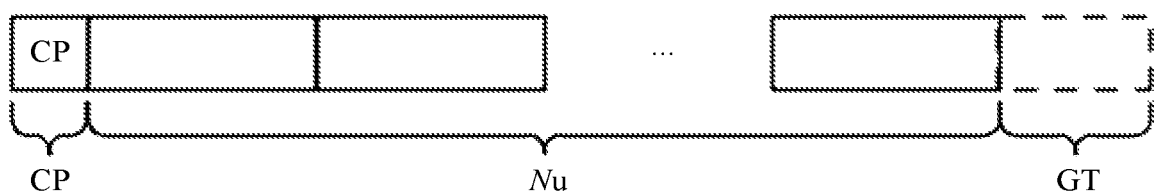
FIG. 2 is a schematic diagram of a random access preamble format according to an embodiment of this application.

For example, a schematic diagram of the random access preamble format is shown in FIG. 2. It can be learned from the above that, $N_{CP}^{RA}$ of the three random access preamble formats B1, B2, and B3 is smaller than $N_{CP}^{RA}$ of the random access preamble formats A1, A2, and A3. This implies that the random access preamble formats B1, B2, and B3 implement the GT by reducing a CP length. Coverage areas or coverage capabilities of random access preambles in the random access preamble formats B1, B2, and B3 are not greatly different from those of random access preambles in the random access preamble formats A1, A2, and A3.

8. Random Access Transmit Power Determining Method in LTE/NR:

In a current technology, the LTE defines power for sending a random access preamble signal, namely, sending a random access preamble, by a terminal device, and the power is related to at least one of the following parameters: an initial preamble received target power (preambleInitial-ReceivedTargetPower), a power offset corresponding to a random access preamble format (DELTA_PREAMBLE), a quantity of preamble power ramping times (PREAMBLE_POWER_RAMPING_COUNTER), a preamble power ramping step (power ramping step), a path loss estimated by the terminal device, and maximum transmit power allowed by the terminal device.

Specifically, in the current technology, a rule for calculating the transmit power of the random access preamble satisfies the following formula (1):

$$P_{PRACH,b,f,c}(i) = \min\{P_{CMAX,f,c}(i), P_{PRACH,target,f,c} + PL_{b,f,c}\} \text{ [dBm]} \quad \text{Formula (1)}$$

$P_{PRACH,b,f,c}(i)$ represents the transmit power of the random access preamble; $P_{CMAX,f,c}(i)$ represents the maximum transmit power allowed by the terminal device; $P_{PRACH,target,f,c}$ represents a preamble received target power (PREAMBLE_RECEIVED_TARGET_POWER); $PL_{b,f,c}$ represents the path loss estimated by the terminal device; and in subscripts of the foregoing parameters, b is an active bandwidth part (active uplink bandwidth part, UL BWP) index, f is a carrier index, c is a serving cell index, and i is a transmission occasion index.

In the foregoing parameters for determining $P_{PRACH,b,f,c}(i)$, $P_{CMAX,f,c}(i)$ is a preset value [36.101, 6.2.2], and $PL_{b,f,c}$ is obtained by the terminal device through estimation, and is in a unit of decibel (dB). For example, $PL_{b,f,c}$=referenceSignalPower−reference signal received power (RSRP), where referenceSignalPower is transmit power of a reference signal (for example, an SSB or a CSI-RS) configured by a higher layer, and RSRP is a value obtained through measurement based on the reference signal, and is in a unit of decibel (dBm). The RSRP may be obtained after higher layer filtering, or may be obtained at a layer 1. On a premise of accurate estimation of $PL_{b,f,c}$, received power of the random access preamble signal that can be obtained by the network device is $P_{PRACH,target,f,c}$.

In the current technology, a calculation rule of $P_{PRACH,target,f,c}$ satisfies the following formula (2):

$$P_{PRACH,target,f,c} = \text{preambleInitialReceivedTarget-Power} + \text{DELTA\_PREAMBLE} + (\text{PREAMBLE\_POWER\_RAMPING\_COUNTER}-1) \times \text{PREAMBLE\_POWER\_RAMPING\_STEP} + \text{POWER\_OFFSET\_2STEP\_RA} \quad \text{Formula (2)}$$

PreambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; and POWER_OFFSET_2STEP_RA represents a power difference between two-step random access and four-step random access.

It should be noted that, $P_{PRACH,target,f,c}$ is an intermediate value used for calculation of $P_{PRACH,b,f,c}(i)$. When determining $P_{PRACH,target,f,c}$:

Parameters preambleReceivedTargetPower and PREAMBLE_POWER_RAMPING_STEP are configured by the network device. The parameter POWER_OFFSET_2STEP_RA is determined by the terminal device, and an initial value is 0. When the random access type is switched from the two-step random access to the four-step random access, POWER_OFFSET_2STEP_RA= (PREAMBLE_POWER_RAMPING_COUNTER−1)× (MSGA_PREAMBLE_POWER_RAMPING_STEP−PREAMBLE_POWER_RAMPING_STEP), where MSGA_PREAMBLE_POWER_RAMPING_STEP represents a power ramping step of the message A in the two-step random access procedure. The parameter DELTA_PREAMBLE corresponds to the random access preamble format in the random access configuration parameters obtained by the terminal, and a correspondence is shown in Table 4(a) and Table 4(b). Table 4(a) shows a correspondence between a long random access preamble format (long preamble format) and DELTA_PREAMBLE, and Table 4(b) shows a correspondence between a short random access preamble format (short preamble format) and DELTA_PREAMBLE.

TABLE 4(a)

| Random access preamble format | Value of DELTA_PREAMBLE (dB) |
|---|---|
| 0 | 0 |
| 1 | −3 |

TABLE 4(a)-continued

| Random access preamble format | Value of DELTA_PREAMBLE (dB) |
|---|---|
| 2 | −6 |
| 3 | 0 |

TABLE 4(b)

| Random access preamble format | Value of DELTA_PREAMBLE (dB) |
|---|---|
| A1 | $8 + 3 \times \mu$ |
| A2 | $5 + 3 \times \mu$ |
| A3 | $3 + 3 \times \mu$ |
| B1 | $8 + 3 \times \mu$ |
| B2 | $5 + 3 \times \mu$ |
| B3 | $3 + 3 \times \mu$ |
| B4 | $3 \times \mu$ |
| C0 | $11 + 3 \times \mu$ |
| C2 | $5 + 3 \times \mu$ |

When determining $P_{PRACH,target,f,c}$, the parameter PREAMBLE_POWER_RAMPING_COUNTER is determined by the terminal device. Specifically, in the random access procedure, there are two counters, which are respectively used to count a quantity of preamble power ramping times PREAMBLE_POWER_RAMPING_COUNTER and a quantity of preamble transmission times PREAMBLE_TRANSMISSION_COUNTER, where PREAMBLE_TRANSMISSION_COUNTER represents a quantity of times that the terminal device transmits the random access preamble in the random access procedure. PREAMBLE_TRANSMISSION_COUNTER and PREAMBLE_POWER_RAMPING_COUNTER are initialized to 1 when the random access procedure is initiated. In the random access procedure, if an SSB or a CSI-RS corresponding to a transmit beam of the terminal device or the random access preamble determined by the terminal device does not change, PREAMBLE_POWER_RAMPING_COUNTER is increased by 1, that is, PREAMBLE_POWER_RAMPING_COUNTER=PREAMBLE_POWER_RAMPING_COUNTER+1. If a current random access fails, for example, the terminal device does not receive an RAR corresponding to the random access preamble, the terminal device retransmits the message 1 based on an updated PREAMBLE_POWER_RAMPING_COUNTER. However, in the random access procedure, each time the message 1 is transmitted, that is, the random access preamble is transmitted once, PREAMBLE_ TRANSMISSION_COUNTER is increased by 1. In the random access procedure, PREAMBLE_TRANSMISSION_COUNTER and PREAMBLE_POWER_RAMPING_COUNTER are counted until the random access succeeds or a value of PREAMBLE_TRANSMISSION_COUNTER reaches a maximum value.

It can be learned from the foregoing descriptions that, in the solution for determining the transmit power of the random access preamble provided in the current technology, only a scenario in which the terminal device sends only one random access preamble at a time is considered. If the terminal device determines that current random access fails, for example, the terminal device does not receive a corresponding RAR, or conflict resolution fails, power ramping is performed when the random access preamble is subsequently retransmitted. In other words, the current technology provides only a solution in which the terminal device performs power ramping when sending random access preambles at different time points before receiving the corresponding RAR. In this solution, before receiving the corresponding RAR, the terminal device may send a plurality of random access preambles, and transmit powers corresponding to the plurality of random access preambles may be different. Therefore, there are many defects. For example, because there is no determined association relationship between the plurality of sent random access preambles, joint detection cannot be performed on the plurality of random access preambles. In addition, when the plurality of random access preambles are sent, interference to a system is large. Alternatively, transmit power of the plurality of random access preambles cannot be determined, and therefore channel state information cannot be obtained based on the preamble. Therefore, the solution of power ramping for retransmitting the random access preamble in the current technology is not applicable to a scenario in which the terminal device sends a plurality of random access preambles at a same time point of random access before receiving an RAR, or a scenario in which a plurality of random access preambles are sent at different ROs. Therefore, in a scenario in which the terminal device sends a plurality of random access preambles on a same RO or different ROs before receiving an RAR, how to determine transmit power of the random access preamble is currently a problem to be urgently resolved.

To resolve the foregoing problem, this application provides a power determining method, an apparatus, and a system, to resolve the problem of how to determine transmit power for sending a plurality of random access preambles in a random access procedure.

The following describes the technical solutions in embodiments of this application with reference to the accompanying drawings in embodiments of this application. In descriptions of this application, unless otherwise specified, "/" represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists, where A or B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference. In addition, in embodiments of this application, the word such as "example" or "for example" is used to represent giving an example, an illustration, or descriptions. Any embodiment or design scheme described as an "example" or with "for example" in embodiments of this application should not be explained as being more preferred or having more advantages than another embodiment or design scheme. Exactly, use of the word such as "example" or "for example" is intended to present a relative concept in a specific manner for ease of understanding.

In addition, a network architecture and a service scenario described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of a new service scenario, the technical solutions provided in embodiments of this application are also applicable to similar technical problems.

The power determining method provided in this embodiment of this application can be applied to various communication systems. For example, the power determining method provided in this embodiment of this application may be applied to an LTE system, a 5th generation (5G) system, or another similar new future-oriented system. This is not specifically limited in this embodiment of this application. In addition, the terms "system" and "network" can be interchanged with each other.

Figure 3:
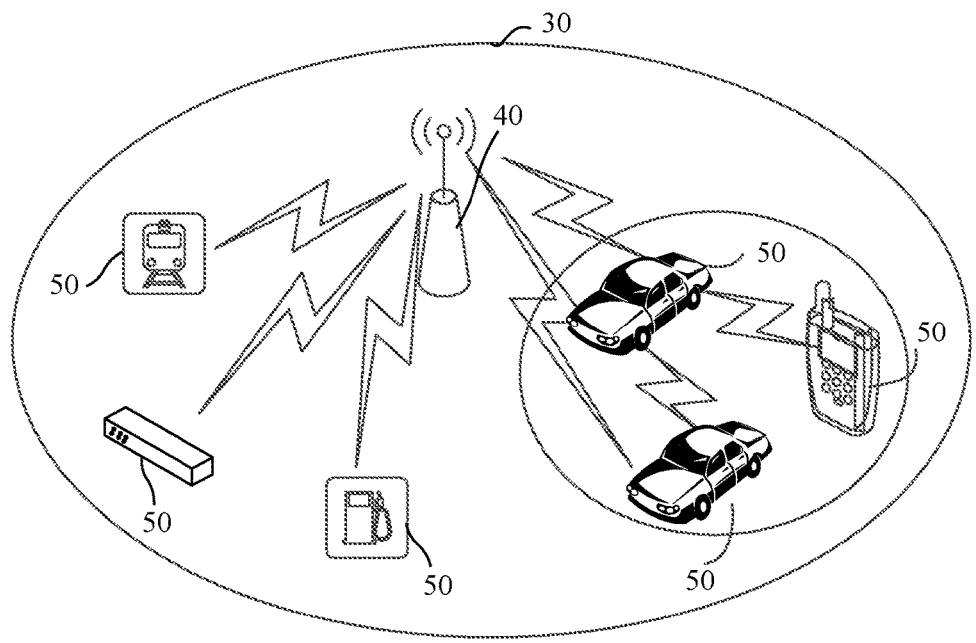
FIG. 3 is a schematic diagram of an architecture of a communication system according to an embodiment of this application.

FIG. 3 shows a communication system 30 according to an embodiment of this application. The communication system 30 includes a network device 40 and one or more terminal devices 50 connected to the network device 40. The terminal device 50 is connected to the network device 40 in a wireless manner. Optionally, different terminal devices 50 may communicate with each other. The terminal device 50 may be located at a fixed position, or may be mobile.

It should be noted that, FIG. 3 is merely a schematic diagram. Although not shown, the communication system 30 may further include another network device. For example, the communication system 30 may further include one or more of a core network device, a wireless relay device, and a wireless backhaul device. This is not specifically limited herein. The network device may be connected to the core network device in a wireless or wired manner. The core network device and the network device 40 may be different physical devices that are independent of each other, or functions of the core network device and logical functions of the network device 40 may be integrated into a same physical device, or some functions of the core network device and some functions of the network device 40 may be integrated into one physical device. This is not specifically limited in this embodiment of this application.

An example in which the network device 40 shown in FIG. 3 interacts with any terminal device 50 is used. In a possible implementation, the terminal device 50 is configured to: determine first transmit power of N random access preambles to be sent to the network device, and send the N random access preambles to the network device at the first transmit power. The network device 40 is configured to receive the N random access preambles from the terminal device 50. The first transmit power is related to a quantity N of the random access preambles, where N is an integer greater than 1. Specific implementation of this solution is described in detail in a subsequent method embodiment, and details are not described herein. Based on the power determining method provided in this embodiment of this application, the first transmit power is related to the quantity N of the random access preambles, and the method for determining transmit power of random access preambles when the terminal device sends a plurality of random access preambles in a random access procedure is provided. Therefore, the problem of how to determine the transmit power of sending a plurality of random access preambles is resolved.

An example in which the network device 40 shown in FIG. 3 interacts with any terminal device 50 is used. In another possible implementation, the terminal device 50 is configured to: determine first transmit power of N random access preambles to be sent to the network device, and send the N random access preambles to the network device at the first transmit power. The network device 40 is configured to receive the N random access preambles from the terminal device 50. The first transmit power is related to a transmit power parameter corresponding to the N random access preambles, and N is an integer greater than 1. Specific implementation of this solution is described in detail in a subsequent method embodiment, and details are not described herein. Based on the power determining method provided in this embodiment of this application, the transmit power of sending the N random access preambles is associated with the transmit power parameter corresponding to the N random access preambles, and a method for determining transmit power of random access preambles when a terminal device sends a plurality of random access preambles in a random access procedure is provided. Therefore, a problem of how to determine the transmit power of sending the plurality of random access preambles is resolved.

An example in which the network device 40 shown in FIG. 3 interacts with any terminal device 50 is used. In a possible implementation, the terminal device 50 is configured to: determine first transmit power of N random access preambles to be sent to the network device, and send the N random access preambles to the network device at the first transmit power. The network device 40 is configured to receive the N random access preambles from the terminal device 50. The first transmit power is determined based on preamble received target power, the preamble received target power is related to two adjacent random access types, and N is an integer greater than 1. Based on the power determining method provided in this embodiment of this application, the transmit power of the N random access preambles is determined based on the preamble received target power related to the two adjacent random access types, and a method for determining transmit power of random access preambles when a terminal device sends a plurality of random access preambles in a random access procedure is provided. Therefore, a problem of how to determine the transmit power of sending the plurality of random access preambles is resolved.

Optionally, the network device 40 in this embodiment of this application is a device that access the terminal device 50 to the wireless network. The network device may be a base station, an evolved NodeB (eNodeB), a transmission reception point (TRP), a next generation NodeB (gNB) in a 5G mobile communication system, a base station in a future mobile communication system, an access node in a wireless fidelity (Wi-Fi) system, or the like; or may be a module or a unit that implements some functions of the base station, for example, may be a central unit (CU), or may be a distributed unit (DU). A specific technology and a specific device form that are used by the network device are not limited in embodiments of this application. In this application, unless otherwise specified, the network device is a radio access network device.

Optionally, the terminal device 50 in this embodiment of this application may be a device such as a terminal or a chip that may be used in a terminal, configured to implement a wireless communication function. The terminal may also be referred to as user equipment (UE), a mobile console, a mobile terminal, or the like. The terminal may be a mobile phone, a tablet computer, a computer having a wireless transceiver function, a virtual reality terminal device, an augmented reality terminal device, a wireless terminal in industrial control, a wireless terminal in unmanned driving, a wireless terminal in remote surgery, a wireless terminal in a smart grid, a wireless terminal in transportation security, a wireless terminal in a smart city, a wireless terminal in a smart home, or the like. A specific technology and a specific device form used for the terminal device are not limited in embodiments of this application.

Optionally, the network device 40 and the terminal device 50 in this embodiment of this application may be deployed on land, and include an indoor or outdoor device, a handheld device, or a vehicle-mounted device; or may be deployed on water; or may be deployed on a plane, a balloon, and a satellite in air. Application scenarios of the network device 40 and the terminal device 50 are not limited in this embodiment of this application.

Optionally, the network device 40 and the terminal device 50 in this embodiment of this application may communicate with each other by using a licensed spectrum, or may communicate with each other by using an unlicensed spectrum, or may communicate with each other by using both a licensed spectrum and an unlicensed spectrum. Communication between the network device 40 and the terminal device 50 may be performed by using a spectrum below 6 gigahertz (GHz), a spectrum above 6 GHz, or both a spectrum below 6 GHz and a spectrum above 6 GHz. The spectrum resource used between the network device 40 and the terminal device 50 is not limited in this embodiment of this application.

Optionally, the network device 40 and the terminal device 50 in this embodiment of this application may also be referred to as communication apparatuses, and each may be a general-purpose device or a dedicated device. This is not specifically limited in this embodiment of this application.

Figure 4:
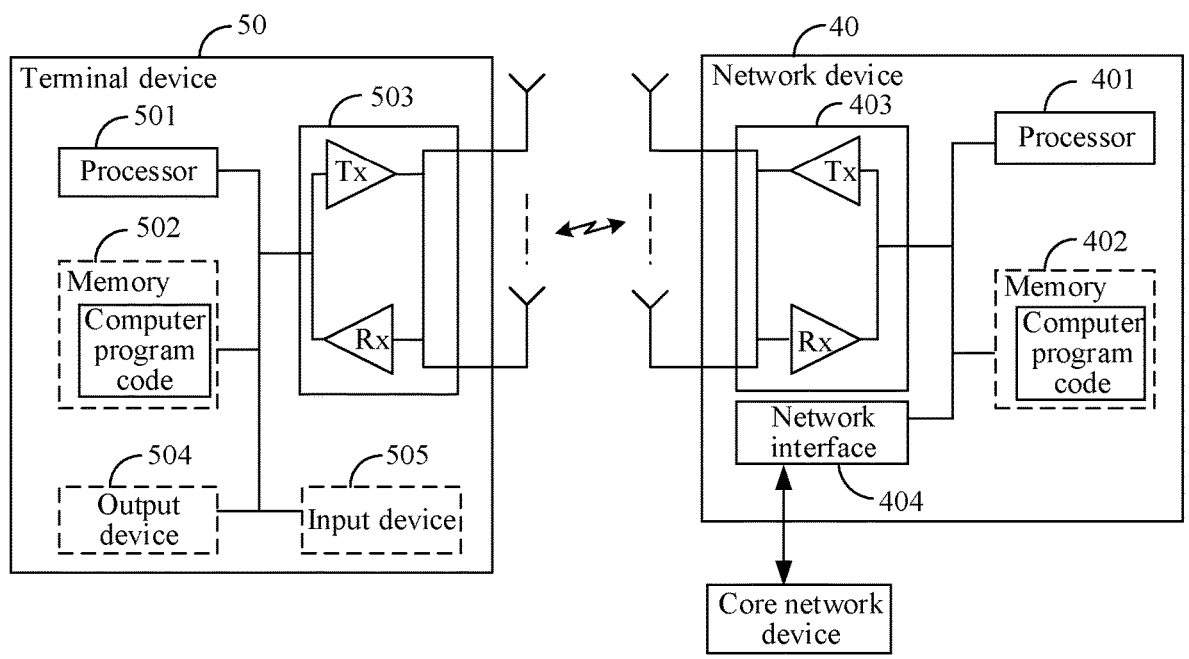
FIG. 4 is a schematic diagram of a structure of a network device and a terminal device according to an embodiment of this application.

Optionally, FIG. 4 is a schematic diagram of structures of the network device 40 and the terminal device 50 according to this embodiment of this application.

The terminal device 50 includes at least one processor 501 and at least one transceiver 503. Optionally, the terminal device 50 may further include at least one memory 502, at least one output device 504, or at least one input device 505.

The processor 501, the memory 502, and the transceiver 503 are connected through a communication line. The communication line may include a path transmitting information between the foregoing components.

The processor 501 may be a general purpose central processing unit (CPU), or may be another general purpose processor, a digital signal processor (DSP), an application-specific integrated circuit (ASIC), a field programmable gate array (FPGA), or another programmable logic device, a transistor logic device, a hardware component, or any combination thereof. The general purpose processor may be a microprocessor or any regular processor or the like. During specific implementation, in an embodiment, the processor 501 may alternatively include a plurality of CPUs, and the processor 501 may be a single-core processor or a multi-core processor. The processor herein may be one or more devices, circuits, or processing cores configured to process data.

The memory 502 may be an apparatus having a storage function. For example, the memory 502 may be a read-only memory (ROM), another type of static storage device that can store static information and instructions, a random access memory (RAM), or another type of dynamic storage device that can store information and instructions, or may be a programmable read-only memory (PROM), a erasable programmable read-only memory (EPROM), an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic storage medium or another magnetic storage device, or any other medium that can be used to carry or store expected program code in a form of instructions or a data structure and that can be accessed by a computer. However, this is not limited thereto. The memory 502 may exist independently, and is connected to the processor 501 through the communication line. Alternatively, the memory 502 may be integrated with the processor 501.

The memory 502 is configured to store computer-executable instructions for performing the solutions in this application, and the processor 501 controls execution of the computer-executable instructions. Specifically, the processor 501 is configured to execute the computer-executable instructions stored in the memory 502, to implement the power determining method in this embodiment of this application.

Alternatively, optionally, in this embodiment of this application, the processor 501 may perform processing-related functions in the power determining method provided in the following embodiments of this application. The transceiver 503 is responsible for communicating with another device or a communication network. This is not specifically limited in this embodiment of this application.

Optionally, the computer-executable instructions in this embodiment of this application may also be referred to as application program code or computer program code. This is not specifically limited in this embodiment of this application.

The transceiver 503 may use any apparatus such as a transceiver, and is configured to communicate with another device or a communication network such as the Ethernet, a radio access network (RAN), or a wireless local area network (WLAN). The transceiver 503 includes a transmitter (Tx) and a receiver (Rx).

The output device 504 communicates with the processor 501, and may display information in a plurality of manners. For example, the output device 504 may be a liquid crystal display (LCD), a light emitting diode (LED) display device, a cathode ray tube (CRT) display device, a projector, or the like.

The input device 505 communicates with the processor 501, and may receive an input of a user in a plurality of manners. For example, the input device 505 may be a mouse, a keyboard, a touchscreen device, a sensor device, or the like.

The network device 40 includes at least one processor 401, at least one transceiver 403, and at least one network interface 404. Optionally, the network device 40 may further include at least one memory 402. The processor 401, the memory 402, the transceiver 403, and the network interface 404 are connected through a communication line. The network interface 404 is configured to connect to a core network device through a link (for example, an S1 interface), or connect to a network interface of another network device through a wired or wireless link (for example, an X2 interface) (not shown in FIG. 4). This is not specifically limited in this embodiment of this application. In addition, for descriptions about the processor 401, the memory 402, and the transceiver 403, refer to descriptions about the processor 501, the memory 502, and the transceiver 503 in the terminal device 50. Details are not described again herein.

Figure 5:
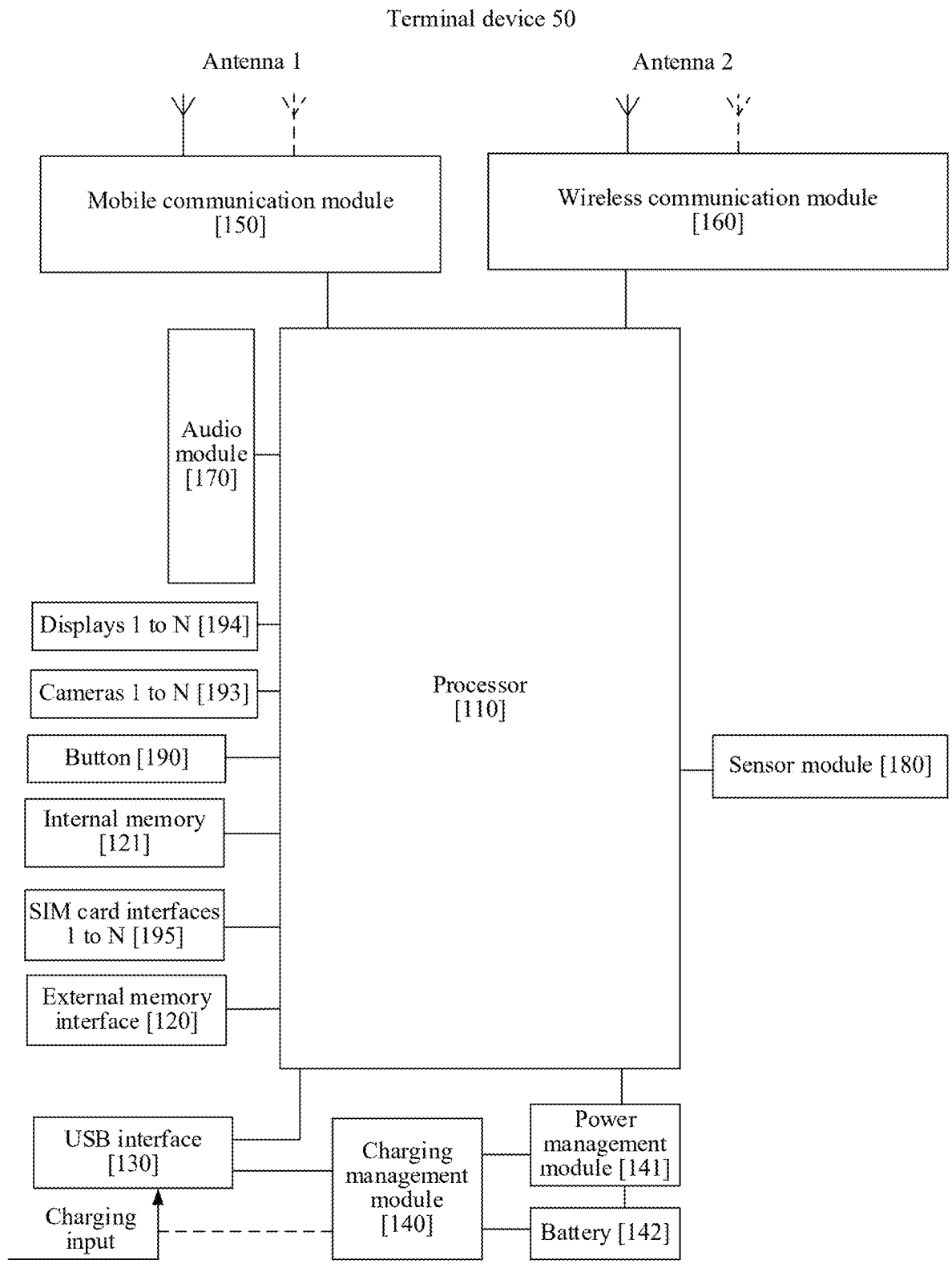
FIG. 5 is a schematic diagram of another structure of a terminal device according to an embodiment of this application.

With reference to the schematic diagram of the structure of the terminal device 50 shown in FIG. 4, for example, FIG. 5 is a specific form of a structure of the terminal device 50 according to an embodiment of this application.

In some embodiments, a function of the processor 501 in FIG. 4 may be implemented by a processor 110 in FIG. 5.

In some embodiments, a function of the transceiver 503 in FIG. 4 may be implemented by using an antenna 1, an antenna 2, a mobile communication module 150, a wireless communication module 160, and the like in FIG. 5. The mobile communication module 150 may provide a wireless communication solution applied to the terminal device 100, including LTE, NR, future mobile communication, or the like. The wireless communication module 160 may provide a solution to the wireless communication technology including a WLAN (for example, a Wi-Fi network), Bluetooth (BT), a global navigational satellite system (GNSS), frequency modulation (FM), near field communication (NFC), infrared, and the like applied to the terminal device 100. In some embodiments, the antenna 1 of the terminal device 50 is coupled to the mobile communication module 150, and the antenna 2 is coupled to the wireless communication module 160, so that the terminal device 50 can communicate with a network and another device by using a wireless communication technology.

In some embodiments, a function of the memory 502 in FIG. 4 may be implemented by using an internal memory 121, an external memory connected to an external memory interface 120 in FIG. 5, or the like.

In some embodiments, a function of the output device 504 in FIG. 4 may be implemented by using a display screen 194 in FIG. 5.

In some embodiments, a function of the input device 505 in FIG. 4 may be implemented by using a mouse, a keyboard, a touchscreen device, or a sensor module 180 in FIG. 5.

In some embodiments, as shown in FIG. 5, the terminal device 50 may further include one or more of an audio module 170, a camera 193, a key 190, a SIM card interface 195, a USB interface 130, a charging management module 140, a power management module 141, and a battery 142.

It may be understood that the structure shown in FIG. 5 does not constitute a specific limitation on the terminal device 50. For example, in some other embodiments of this application, the terminal device 50 may include more or fewer components than those shown in the figure, or combine some components, or split some components, or have different component arrangements. The components shown in the figure may be implemented by using hardware, software, or a combination of software and hardware.

With reference to FIG. 1 to FIG. 5, the following describes in detail the power determining method provided in embodiments of this application by using an example in which the network device 40 interacts with any terminal device 50 shown in FIG. 3.

It should be noted that names of messages between the network elements, names of parameters in the messages, or the like in the following embodiments of this application are merely examples, and there may be other names during specific implementation. This is not specifically limited in embodiments of this application.

Figure 6:
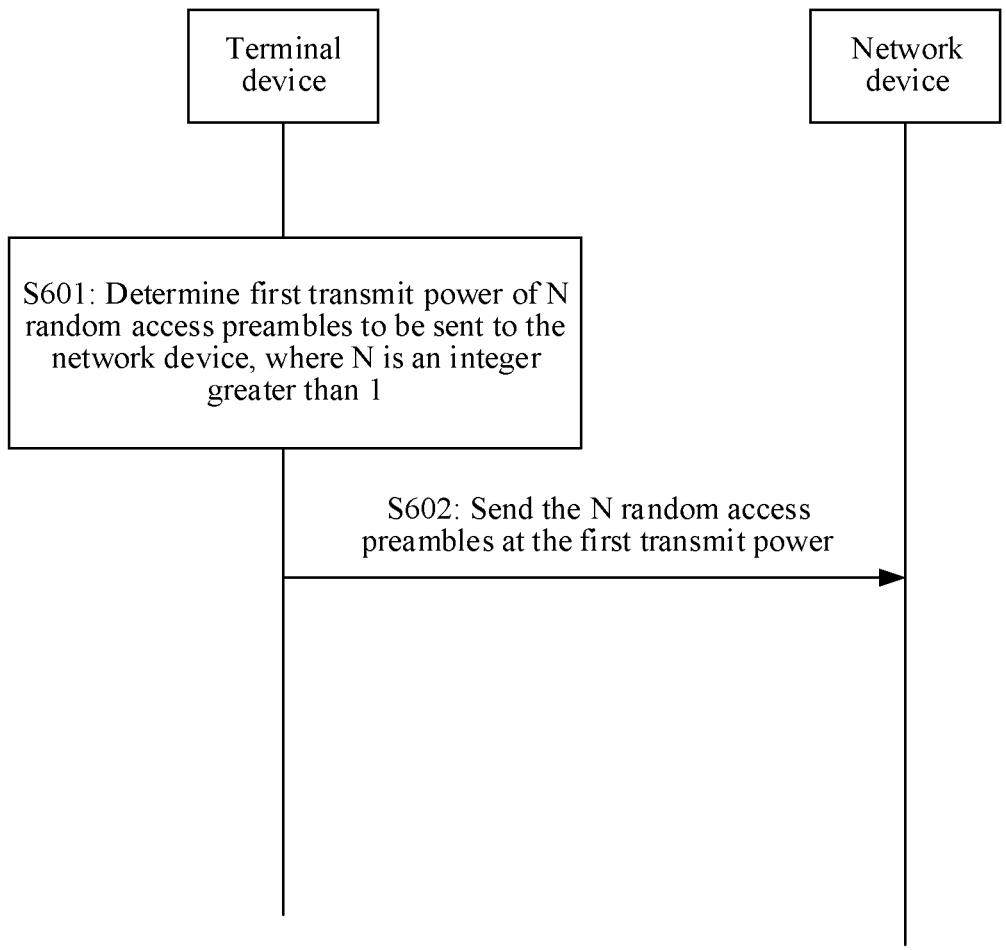
FIG. 6 is a schematic flowchart of a power determining method according to an embodiment of this application.

FIG. 6 shows a power determining method according to an embodiment of this application. The power determining method includes the following steps S601 and S602:

S601: A terminal device determines first transmit power of N random access preambles to be sent to a network device, where N is an integer greater than 1.

S602: The terminal device sends the N random access preambles to the network device at the first transmit power. Correspondingly, the network device receives the N random access preambles from the terminal device.

It should be noted that in this embodiment of this application, the terminal device sends a plurality of random access preambles before receiving an RAR. Therefore, in this embodiment of this application, a message 1 in the random access procedure is no longer the message 1 that includes one random access preamble and that is defined in the current technology. In other words, in this embodiment of this application, the message 1 in the random access procedure is a logical concept, and refers to signals corresponding to the N random access preambles sent by the terminal device before the terminal device receives the RAR.

The following describes steps S601 and S602.

In this embodiment of this application, the terminal device may determine, based on a measurement result of at least one SS/PBCH block and/or a CSI-RS, the N random access preambles and an RO associated with the SS/PBCH block and/or the CSI-RS.

Optionally, in this embodiment of this application, the N random access preambles may be understood as follows.

When sending the message 1, the terminal device correspondingly sends the N random access preambles (A UE can be configured to transmit multiple simultaneous Msg.1. Note: multiple simultaneous Msg.1 transmissions use different frequency resources and/or use the same frequency resource with different preamble indices). Alternatively, when receiving a message 2, the terminal device may correspondingly receive an RAR corresponding to the N random access preambles (Multiple PRACH transmissions before the end of RAR window. For example, a UE can be configured to transmit multiple Msg.1 over multiple RACH transmission occasions in the time domain before the end of a monitored RAR window; or for contention free case, a UE can be configured to transmit multiple Msg.1 over dedicated multiple RACH transmission occasions in time domain before the end of a monitored RAR window if the configuration of dedicated multiple RACH transmission occasions in time domain is supported). Alternatively, the terminal device sends the N random access preambles within a time period from successfully receiving the message 2 last time to possibly receiving the message 2 next time. Alternatively, the terminal device sends the N random access preambles at a moment at which the message 2 is received for the first time.

It should be understood that the N random access preambles determined by the terminal device are determined based on a rule predefined in a protocol and a parameter configured by the network device. To be specific, the N random access preambles may be determined according to a fixed rule, so that the network device can detect the N random access preambles by using a corresponding method, to improve detection (for example, joint detection) accuracy of the random preambles, or make the random access preamble more useful (where for example, different random access preambles correspond to different transmit antenna ports of the terminal device, so that a channel of each transmit antenna port may be obtained, to enable uplink closed-loop precoding transmission and improve uplink coverage).

Optionally, a value of N is determined or predefined based on configuration information of the network device. For example, N=2 or N=4. Alternatively, for example, a random access occasion and/or random access preambles in the random access occasion are divided into a plurality of groups. In a first random access preamble group, N=1, to be specific, only one random access preamble is sent for a single random access message 1. In a second random access preamble group, N=2, to be specific, two random access preambles are sent for a single random access message 1.

Further, time and frequency positions of the N random access preambles are determined according to a predefined rule. For example, the N random access preambles need to be in a same RO, and random access preamble indexes of the N random access preambles in one RO are respectively R, $R+N_{preamble}^{Step}$, $R+(N-1)N_{preamble}^{Step}$, where R represents a start index position, and $N_{preamble}^{Step}$ represents an interval between random access preamble indexes. Further, R and $N_{preamble}^{Step}$ may be determined based on the configuration information of the network device. In this application, a method of forming the N random access preambles is not limited.

Optionally, a sending manner of the N random access preambles is determined or predefined based on the configuration information of the network device. For example, the sending manner of the N random access preambles includes: The N random access preambles correspond to a same random access channel occasion RO (sending manner 1); the N random access preambles correspond to a same random access time domain resource and different random access frequency domain resources (sending manner 2); or the N random access preambles correspond to different random access time domain resources (sending manner 3).

The sending manner of the N random access preambles is divided based on a time-frequency resource. Further, the sending manner of the N random access preambles may alternatively be divided at a physical layer. For example, the N random access preambles may be separately sent through different antenna ports or antenna panels (sending manner 4); the N random access preambles are separately associated with more than one SSB and/or CSI-RS (sending manner 5); or the N random access preambles are separately quasi-co-located (QCL) to more than one SSB and/or CSI-RS (sending manner 6). Optionally, in this embodiment of this application, QCL means that there is one or more same or similar communication characteristics between a parameter used when a random access preamble is sent or received and a parameter of the SSB and/or CSI-RS. A same or similar communication configuration may be used for a plurality of resources having the quasi co-location relationship. Specifically, signals corresponding to antenna ports that have a QCL relationship have a same parameter, or a parameter (or referred to as a QCL parameter) of one antenna port may be used to determine a parameter of another antenna port that has a QCL relationship with the antenna port, or two antenna ports have a same parameter, or a parameter difference between two antenna ports is less than a threshold. The parameter may include one or more of the following: a delay spread, a Doppler spread, a Doppler shift, an average delay, an average gain, and a spatial reception parameter (spatial Rx parameters). The spatial reception parameter may include one or more of the following: an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmit beam, a receive beam, and a resource identifier.

It should be noted that, in this embodiment of this application, the manner 1, the manner 2, or the manner 3 may be randomly combined with different sending manners in which the terminal device sends the N random access preambles at the physical layer.

Optionally, in this embodiment of this application, the terminal device may determine a sending time point of the N random access preambles in at least one of the following manners.

The N random access preambles are sent before the message 2 is received. Further, the N random access preambles are sent before a slot $W_{start}-x_0$; the N random access preambles are sent before a slot $W_{start}+x_1$; or the N random access preambles are sent before a slot $W_{end}-x_2$; or end the N random access preambles are sent before a slot $W_{end}+x_3$. $W_{start}$ and $W_{end}$ respectively represent a start slot and a receive slot of a receive window (that is, a receive window of the RAR) of the message 2, $x_0$, $x_1$, $x_2$, and $x_3$ are nonnegative integers, and $x_0$, $x_1$, $x_2$, and $x_3$ may be values predefined by the terminal device or values determined by the terminal device based on the configuration information delivered by the network device. It should be noted that the slot herein is determined based on a PDCCH subcarrier spacing corresponding to the message 2. Configuration of the receive window of the message 2 may be defined in the current technology, and may be determined based on a configuration parameter delivered by the network device, or may be determined based on an earliest sending time point of the N random access preambles. This is not specifically limited in this embodiment of this application. It should be noted that a manner of determining sending time points of the N random access preambles may be independently selected by the terminal device, or determined by the terminal device based on the configuration information delivered by the network device. This is not specifically limited in this embodiment of this application.

In this embodiment of this application, in a possible implementation, the first transmit power is related to a quantity N of the random access preambles, where N is an integer greater than 1. Optionally, the first transmit power is further related to a sending manner of the N random access preambles. The following describes the implementation in detail.

For example, the first transmit power satisfies the following formula (3):

$$P_{PRACH,b,f,c}(i)=\min\{P_{CMAX,f,c}(i), P_{PRACH,target,f,c}+\Delta(N)+PL_{b,f,c}\} \text{ [dbm]} \quad \text{Formula (3)}$$

$P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $\Delta(N)$ represents a power offset determined based on the quantity N of the random access preambles.

In the foregoing formula (3), $P_{PRACH,target,f,c}$ satisfies the foregoing formula (2), and details are not described herein again.

Alternatively, for example, the first transmit power satisfies the foregoing formula (1), but the parameter $P_{PRACH,target,f,c}$ in the formula (1) satisfies the following formula (4):

$$P_{PRACH,target,f,c}=\text{preambleReceivedTargetPower}+\Delta(N)+\text{DELTA\_PREAMBLE}+(\text{PREAMBLE\_POWER\_RAMPING\_COUNTER}-1)\times\text{PREAMBLE\_POWER\_RAMPING\_STEP}+\text{POWER\_OFFSET\_2STEP\_RA} \quad \text{Formula (4)}$$

In the foregoing formula (4), preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; POWER_OFFSET_2STEP_RA represents a power difference between two-step random access and four-step random access; and $\Delta(N)$ represents the power offset determined based on the quantity N of the random access preambles.

Alternatively, for example, the first transmit power satisfies the foregoing formula (1), but the parameter $P_{PRACH,target,f,c}$ in the formula (1) satisfies the following formula (5):

$$P_{PRACH,target,f,c}=\text{preambleReceivedTargetPower}+\text{DELTA\_PREAMBLE}+(\text{PREAMBLE\_POWER\_RAMPING\_COUNTER}-1)\times(\text{PREAMBLE\_POWER\_RAMPING\_STEP}+\Delta(N))+\text{POWER\_OFFSET\_2STEP\_RA} \quad \text{Formula (5)}$$

In the foregoing formula (5), preambleReceivedTargetPower represents the preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; POWER_OFFSET_2STEP_RA represents a power difference between two-step random access and four-step random access; and $\Delta(N)$ represents the power offset determined based on the quantity N of the random access preambles.

Alternatively, for example, the first transmit power satisfies the foregoing formula (1), and details are not described herein again.

In the foregoing formula (1), $P_{PRACH,target,f,c}$ satisfies the foregoing formula (2), and details are not described herein again.

In the foregoing formula (2), DELTA_PREAMBLE is related to $\Delta(N)$, and $\Delta(N)$ represents the power offset determined based on the quantity N of the random access preambles. For example, a mapping relationship between DELTA_PREAMBLE and $\Delta(N)$ may be shown in Table 5(a) and Table 5(b). Table 5(a) shows a correspondence between a second preamble format set and DELTA_PREAMBLE, and Table 5(b) shows a correspondence between a first preamble format set and DELTA_PREAMBLE.

TABLE 5(a)

| Random access preamble format | Power offset (dB) |
|---|---|
| 0 | 0 + $\Delta(N)$ |
| 1 | −3 + $\Delta(N)$ |
| 2 | −6 + $\Delta(N)$ |
| 3 | 0 + $\Delta(N)$ |

TABLE 5(b)

| Random access preamble format | Power offset (dB) |
|---|---|
| A1 | 8 + 3 × $\mu$ + $\Delta(N)$ |
| A2 | 5 + 3 × $\mu$ + $\Delta(N)$ |
| A3 | 3 + 3 × $\mu$ + $\Delta(N)$ |
| B1 | 8 + 3 × $\mu$ + $\Delta(N)$ |
| B2 | 5 + 3 × $\mu$ + $\Delta(N)$ |
| B3 | 3 + 3 × $\mu$ + $\Delta(N)$ |

TABLE 5(b)-continued

| Random access preamble format | Power offset (dB) |
|---|---|
| B4 | $3 \times \mu + \Delta(N)$ |
| C0 | $11 + 3 \times \mu + \Delta(N)$ |
| C2 | $5 + 3 \times \mu + \Delta(N)$ |

Optionally, that the first transmit power is related to a quantity N of the random access preambles includes: The first transmit power is related to POWER_OFFSET_MULTI_RA, where POWER_OFFSET_MULTI_RA is related to N.

For example, the first transmit power satisfies the foregoing formula (1), but the parameter $P_{PRACH,target,f,c}$ in the formula (1) satisfies the following formula (6):

$P_{PRACH,target,f,c}$=preambleReceivedTargetPower+
DELTA_PREAMBLE+(PREAMBLE_POWER_RAMPING_COUNTER−1)×PREAMBLE_POWER_RAMPING_STEP+POWER_OFFSET_MULTI_RA    Formula (6)

preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; and POWER_OFFSET_MULTI_RA represents a power difference between random access of N random access preambles and random access of a single random access preamble.

Alternatively, for example, the first transmit power satisfies the foregoing formula (1), but the parameter $P_{PRACH,target,f,c}$ in the formula (1) satisfies the following formula (7):

$P_{PRACH,target,f,c}$=preambleReceivedTargetPower+
DELTA_PREAMBLE+(PREAMBLE_POWER_RAMPING_COUNTER−1)×PREAMBLE_POWER_RAMPING_STEP+
POWER_OFFSET_2STEP_RA+POWER_OFFSET_MULTI_RA    Formula (7)

preambleReceivedTargetPower represents initial preamble received target power; DELTA_PREAMBLE represents a power offset corresponding to a random access preamble format; PREAMBLE_POWER_RAMPING_COUNTER represents a quantity of preamble power ramping times; PREAMBLE_POWER_RAMPING_STEP represents a preamble power ramping step; POWER_OFFSET_2STEP_RA represents a power difference between two-step random access and four-step random access; and POWER_OFFSET_MULTI_RA represents a power difference between random access of N random access preambles and random access of a single random access preamble.

In this embodiment of this application, $\Delta(N)$ is a power offset determined based on N. For example, $\Delta(N)$ may meet the following relationship:

$\Delta(N)=10\log_{10}(N)$, where $\log_{10}(N)$ represents a logarithm of N to base 10;

$\Delta(N)=\lfloor 10\log_{10}(N)\rfloor$, where $\lfloor\ \rfloor$ represents rounding down;

$\Delta(N)=\lceil 10\log_{10}(N)\rceil$, where $\lceil\ \rceil$ represents rounding up;

$\Delta(N)=\text{round}(10\log_{10}(N))$, where round represents rounding off;

$\Delta(N)=-10\log_{10}(N)$;

$\Delta(N)=-\lfloor 10\log_{10}(N)\rfloor$, where $\lfloor\ \rfloor$ represents rounding down;

$\Delta(N)=-\lceil 10\log_{10}(N)\rceil$, where $\lceil\ \rceil$ represents rounding up; or $\Delta(N)=-\text{round}(10\log_{10}(N))$, where round represents rounding off.

It should be noted that the power determining method provided in this embodiment of this application may be applicable to determining total power for sending the N random access preambles, or applicable to determining transmit power of each random access preamble when the N random access preambles are sent. This is not limited in this application.

It should be understood that when N is greater than 1 and has only one value, $\Delta(N)$ is a constant. Specifically, $\Delta(N)$ is a positive integer, for example, $\Delta(N)=3$; for another example, $\Delta(N)=6$; for another example, $\Delta(N)=2$; and for another example, $\Delta(N)=4$.

Optionally, when N is greater than 1 and has only one value, $\Delta(N)$ is a negative integer, for example, $\Delta(N)=-3$; for another example, $\Delta(N)=-6$; for another example, $\Delta(N)=-2$; and for another example, $\Delta(N)=-4$.

Optionally, in this embodiment of this application, if the message 1 is sent through K antenna ports, the determined first transmit power may be evenly distributed to all antenna ports. The K antenna ports may be logical antenna ports or antennas at the physical layer. For example, transmit power on each antenna port may be $P_{PRACH,b,f,c}(i)/K$.

Optionally, in this embodiment of this application, if the message 1 is sent through a plurality of antenna ports, the determined first transmit power may be evenly distributed to actually used K antenna ports based on a total quantity M of antenna ports on the terminal device side. The K antenna ports may be logical antenna ports or antennas at the physical layer. For example, transmit power on each antenna port may be $P_{PRACH,b,f,c}(i)/K$.

Optionally, in this embodiment of this application, if the message 1 is sent through a plurality of antenna ports, the determined first transmit power may be unevenly distributed to all antenna ports. The antenna ports herein may be logical antenna ports or antennas at the physical layer. Further, power on each antenna port may be allocated according to a rule. For example, for the first antenna port, transmit power is determined in a manner of determining the transmit power of the plurality of random access preambles provided in this embodiment of this application, and a power determining manner provided in the existing LTE/NR system is used for another antenna port.

In this embodiment of this application, the first transmit power is further related to the sending manner of the N random access preambles. For related descriptions of the sending manner of the N random access preambles, refer to the foregoing content in this embodiment of this application. Details are not described herein again.

For example, in a first sending manner, calculation of the first transmit power satisfies formula (3), and in a second sending manner, calculation of the first transmit power satisfies formula (1) and $P_{PRACH,target,f,c}$ satisfies formula (4); or in the first sending manner, $\Delta(N)$ is a positive value, for example, $\Delta(N)=\lfloor 10\log_{10}(N)\rfloor$, and in the second sending manner, $\Delta(N)$ is a negative value, for example, $\Delta(N)=-10\log_{10}(N)$. The first sending manner or the second sending manner may be at least one of the foregoing sending manner 1, sending manner 2, sending manner 3, sending manner 4, sending manner 5, or sending manner 6. When the first transmit power is related to Δ(N) and the sending manner, how to obtain a value of the first transmit power and Δ(N) is not limited in this embodiment of this application.

In this implementation, when Δ(N) is a positive value, random access transmit power is higher, so that each preamble supports independent detection, and channel state information or the like may further be obtained based on the random access preamble. When Δ(N) is a negative value, transmit power of a single random access preamble is lower, and interference to another signal is small. However, if N preambles are jointly detected, good detection performance can be obtained.

This embodiment of this application provides the method for determining transmit power of a plurality of random access preambles, and the first transmit power for sending the N random access preambles is related to N, so that interference in the random access procedure is reduced, and random access performance is improved. This resolves a problem in the current technology that there is no method for determining transmit power of a plurality of random access preambles.

In this embodiment of this application, in another possible implementation, the first transmit power is related to a transmit power parameter corresponding to the N random access preambles, and N is an integer greater than 1.

Optionally, in this embodiment of this application, the transmit power parameter corresponding to the N random access preambles includes at least one of the following:
  a quantity of preamble power ramping times (which may be expressed as MULTI_PREAMBLE_POWER_RAMPING_COUNTER) corresponding to the N random access preambles;
  a quantity of preamble transmission times (which may be expressed as PREAMBLE_TRANSMISSION_COUNTER) corresponding to the N random access preambles;
  initial preamble received target power (which may be expressed as MULTI_preambleReceivedTargetPower) corresponding to the N random access preambles;
  a preamble power ramping step (which may be expressed as MULTI_PREAMBLE_POWER_RAMPING_STEP) corresponding to the N random access preambles; or
  a difference between a power ramping step corresponding to N random access preambles and a power ramping step corresponding to a single random access preamble (which may be expressed as POWER_OFFSET_MULTI_RA).

It should be noted that, in this embodiment of this application, random access types are classified into two types based on the quantity of random access preambles corresponding to the message 1: a single random access preamble type in which the message 1 corresponds to a single random access preamble, and an N random access preambles type in which the message 1 corresponds to a plurality of random access preambles. Different random access types may correspond to different parameters. In other words, in this embodiment of this application, a transmit power parameter corresponding to the N random access preambles and a transmit power parameter corresponding to a single random access preamble are different parameters.

The transmit power parameter corresponding to the N random access preambles is related to X, where X is a positive integer greater than 1.

For example, each time the N random access preambles are sent, the quantity of preamble power ramping times corresponding to the N random access preambles is increased by X1 (assuming that X=X1). Specifically, X1 may be N, indicating that the quantity of preamble power ramping times corresponding to the N random access preambles is related to N.

For example, an adjustment amount of the quantity of preamble transmission times corresponding to the N random access preambles may be related to X. For example, each time the message 1 is sent, an adjustment amount of PREAMBLE_TRANSMISSION_COUNTER is X3, that is, PREAMBLE_TRANSMISSION_COUNTER= PREAMBLE_TRANSMISSION_COUNTER+X3 (assuming that X=X1). Specifically, X3 may be N, indicating that the quantity of preamble transmission times corresponding to the N random access preambles is related to N.

The transmit power parameter corresponding to the N random access preambles may be related to N. For example, the difference between a power ramping step corresponding to the N random access preambles and a power ramping step corresponding to a single random access preamble may be related to N. For example, if an initial value of POWER_OFFSET_MULTI_RA is 0, when the random access type is switched from two-step random access to four-step random access, POWER_OFFSET_MULTI_RA=(PREAMBLE_POWER_RAMPING_COUNTER−1)×(MULTI_ PREAMBLE_POWER_RAMPING_STEP−PREAMBLE_POWER_RAMPING_STEP). MULTI_PREAMBLE_POWER_RAMPING_STEP is the preamble power ramping step corresponding to the N random access preambles.

The transmit power parameter corresponding to the N random access preambles may be related to the sending manner of the random access preamble. For example, that the quantity of preamble power ramping times corresponding to the N random access preambles is related to the sending manner of the N random access preambles is used as an example for description. For example, in the first sending manner, MULTI_PREAMBLE_POWER_RAMPING_COUNTER= MULTI_PREAMBLE_POWER_RAMPING_COUNTER+X2, and in the second sending manner, MULTI_ PREAMBLE_POWER_RAMPING_COUNTER= MULTI_PREAMBLE_POWER_RAMPING_COUNTER+ 1. Alternatively, in the first sending manner, MULTI_ PREAMBLE_POWER_RAMPING_COUNTER= MULTI_PREAMBLE_POWER_RAMPING_COUNTER+ 1, and in the second sending manner, MULTI_ PREAMBLE_ POWER_RAMPING_COUNTER= MULTI_PREAMBLE_POWER_RAMPING_COUNTER+ X2. X2 is a positive integer greater than 1. Specifically, X2 may be N. The first sending manner or the second sending manner may be at least one of the foregoing sending manner 1, sending manner 2, sending manner 3, sending manner 4, sending manner 5, or sending manner 6.

It should be noted that a value of the transmit power parameter, when the transmit power parameter corresponding to the N random access preambles is related to the sending manner of the N random access preambles, is not limited in this embodiment of this application. For example, when the quantity of preamble power ramping times corresponding to the N random access preambles is related to the sending manner of the N random access preambles, for example, when the sending manner is the sending manner 1 or the sending manner 2, MULTI_PREAMBLE_POWER_RAMPING_COUNTER= MULTI_PREAMBLE_POWER_RAMPING_COUNTER+

X1. In this case, the power ramps for a plurality of times, so that an access delay can be reduced. When the sending manner is the sending manner 3, MULTI_PREAMBLE_ POWER_RAMPING_COUNTER= MULTI_PREAMBLE_POWER_RAMPING_COUNTER+ 1. In this case, transmit power in the plurality of times may be consistent. Therefore, the power ramps only once, to prevent the terminal from sending excessive power. Alternatively, when the sending manner is the sending manner 1 or the sending manner 2, MULTI_PREAMBLE_POWER_ RAMPING_COUNTER= MULTI_PREAMBLE_POWER_RAMPING_COUNTER+ 1. In this case, the power ramps only once, to prevent the terminal from sending excessive power. When the sending manner is the sending manner 3, MULTI_PREAMBLE_ POWER_RAMPING_COUNTER= MULTI_PREAMBLE_POWER_RAMPING_COUNTER+ X1. In this case, transmit power in the plurality of times may be consistent. Therefore, the power ramps for N times, which facilitates a higher success rate of next sending. It can be learned that in this embodiment of this application, if the transmit power parameter corresponding to the N random access preambles is related to the sending manner of the N random access preambles, technical effects of different solutions are also different, so that the power determining method provided in this embodiment of this application is more flexible, and is applicable to random access procedures in different cases.

In this embodiment of this application, the transmit power parameter corresponding to the N random access preambles may be configured by the network device, and may be a parameter different from the transmit power parameter corresponding to a single random access preamble. For example, both the initial preamble received target power corresponding to the N random access preambles and the preamble power ramping step corresponding to the N random access preambles may be configured by the network device.

In this embodiment of this application, a method for determining the transmit power of a plurality of random access preambles is provided, and a parameter related to random access power control is associated with the quantity N of random access preambles corresponding to the message 1. This resolves a problem in the current technology that there is no method for determining transmit power of a plurality of random access preambles, and makes random access power control more accurate. This helps control interference in the random access procedure and improves an access success rate.

In addition, for a scenario in which the terminal device switches the random access type during random access, an embodiment of this application further provides a power determining method.

In this embodiment of this application, in another possible implementation, the first transmit power is determined based on preamble received target power, the preamble received target power is related to two adjacent random access types, and N is an integer greater than 1. It should be noted that, random access types in this scenario include a single random access preamble type in which the message 1 corresponds to a single random access preamble and an N random access preambles type in which the message 1 corresponds to a plurality of random access preambles, where N is an integer greater than 1.

In this embodiment of this application, when the terminal device determines that the random access type is switched, for example, the random access type is switched from the single random access preamble type to the N random access preambles type, or from the N random access preambles type to the single random access preamble type, the terminal device determines the preamble received target power related to the two adjacent random access types.

It should be noted that the scenario of switching the random access type is not limited in this embodiment of this application. In other words, the random access type may be switched in one random access procedure or in different random access procedures. For example, in one random access procedure, one message 1 corresponds to one random access preamble, and a next message 1 corresponds to a plurality of random access preambles. Alternatively, in one random access procedure, one message 1 corresponds to one random access preamble, and in a next random access procedure, one message 1 corresponds to a plurality of random access preambles. In all the foregoing scenarios, switching of the random access type is determined.

In this embodiment of this application, that the preamble received target power is related to the two adjacent random access types includes: A parameter for determining the preamble received target power is related to the two adjacent random access types.

For example, when the two adjacent random access types are different, the parameter that is for determining the preamble receive target power and that corresponds to a subsequent random access is different from a parameter that is for determining the preamble receive target power and that corresponds to a previous random access. For example, when the previous random access type is the single random access preamble type, and the current random access type is the N random access preambles type, initial preamble received target power of the current random access is initial preamble received target power (which may be expressed as MULTI_preambleReceivedTargetPower) corresponding to the N random access preambles.

In this embodiment of this application, that the preamble received target power is related to the two adjacent random access types further includes: Calculation of the parameter of the preamble received target power is related to the two adjacent random access types.

For example, that the quantity of preamble power ramping times is related to the two adjacent random access types is used as an example for description. When a previous random access type is the single random access preamble type, the quantity of preamble power ramping times corresponding to a message 1 in previous random access is PREAMBLE_POWER_RAMPING_COUNTER0; or when a current random access type is the N random access preambles type, the quantity of preamble power ramping times corresponding to a message 1 in current random access is PREAMBLE_POWER_RAMPING_COUNTER= PREAMBLE_POWER_RAMPING_COUNTER0+1. In this case, the current random access preamble received target power satisfies the foregoing formula (2), and details are not described herein again. Alternatively, when a previous message 1 corresponds to N random access preambles, where N is an integer greater than 1, that is, the previous random access type is the N random access preambles type, the quantity of preamble power ramping times corresponding to the message 1 in previous random access is PRE- AMBLE_POWER_RAMPING_COUNTER0; or when the current message 1 corresponds to a single random access preamble, the quantity of preamble power ramping times corresponding to the message 1 in current random access is PREAMBLE_POWER_RAMPING_COUNTER= PREAMBLE_POWER_RAMPING_COUNTER0+N. In this case, the current random access preamble received target power satisfies the foregoing formula (2), and details are not described herein again.

Based on the power determining method provided in this embodiment of this application, the transmit power of the N random access preambles is determined based on the preamble received target power related to the two adjacent random access types, and a method for determining transmit power of random access preambles when a terminal device sends a plurality of random access preambles in a random access procedure is provided. Therefore, a problem of how to determine the transmit power of sending the plurality of random access preambles is resolved.

Further, based on the power determining method provided in this embodiment of this application, a method for determining the preamble received target power when the terminal device switches the random access type is further provided. This resolves a problem in the current technology that how to determine a preamble received target power when the terminal device switches the random access type is not provided.

It should be noted that, the solution for determining the first transmit power related to the quantity N of the N random access preambles provided in this embodiment of this application may be combined with the solution of determining the transmit power parameter corresponding to the N random access preambles provided in this embodiment of this application or the solution of determining the preamble received target power related to two adjacent random access types provided in this embodiment of this application. In addition, various implementations in the solutions may also be combined.

It should be noted that, in this embodiment of this application, the solution in which the terminal device determines the first transmit power of N random access preambles to be sent to the network device, where the first transmit power is related to the transmit power parameter corresponding to the N random access preambles, and N is an integer greater than 1 may be only applied to a scenario in which the sending manner of the N random access preambles is the sending manner 3.

The processor 501 in the terminal device 50 shown in FIG. 4 may invoke application program code stored in the memory 502, to instruct the terminal device to perform the actions of the terminal device in steps S601 and S602. The processor 401 in the network device 40 shown in FIG. 4 may invoke application program code stored in the memory 402, to instruct the network device to perform the actions of the network device in steps S501 and S502. This is not limited in this embodiment.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component (for example, a chip or a circuit) that can be used in the network device.

The foregoing mainly describes the solutions provided in embodiments of this application from a perspective of interaction between the network elements. Correspondingly, an embodiment of this application further provides a communication apparatus, and the communication apparatus is configured to implement the foregoing methods. The communication apparatus may be the terminal device in the foregoing method embodiments, or an apparatus including the foregoing terminal device, or a component that can be used in the terminal device. Alternatively, the communication apparatus may be the network device in the foregoing method embodiments, or an apparatus including the foregoing network device, or a component that can be used in the network device. It may be understood that, to implement the foregoing functions, the communication apparatus includes corresponding hardware structures and/or software modules for performing the functions. A person skilled in the art should be easily aware that units and algorithm steps in the examples described with reference to the embodiments disclosed in this specification can be implemented in a form of hardware or a combination of hardware and computer software in this application. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software functional module. It should be noted that, in this embodiment of this application, division into the modules is an example, and is merely a logical function division. In actual implementation, another division manner may be used.

Figure 7:
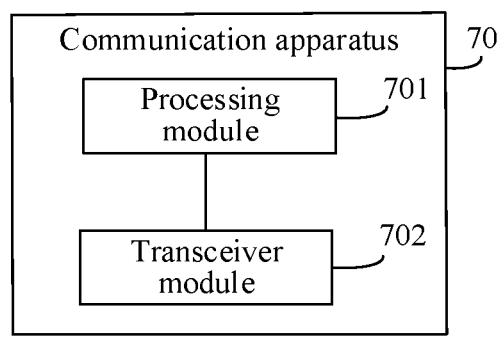
FIG. 7 is a schematic diagram of a structure of a communication apparatus according to an embodiment of this application.

For example, the communication apparatus is the terminal device in the foregoing method embodiments, FIG. 7 is a schematic diagram of a structure of a communication apparatus 70. The communication apparatus 70 includes a transceiver module 702 and a processing module 701. The transceiver module 702 may also be referred to as a transceiver unit, and is configured to implement a transceiver function. For example, the transceiver module 702 may be a transceiver circuit, a transceiver, or a communication interface.

In a possible implementation, the processing module 701 is configured to determine first transmit power of N random access preambles to be sent to a network device, where the first transmit power is related to a quantity N of the random access preambles, and N is an integer greater than 1; and the transceiver module 702 is configured to send the N random access preambles to the network device at the first transmit power.

In another possible implementation, the processing module 701 is configured to determine first transmit power of N random access preambles to be sent to a network device, where the first transmit power is related to a transmit power parameter corresponding to the N random access preambles, and N is an integer greater than 1; and the transceiver module 702 is configured to send the N random access preambles to the network device at the first transmit power.

In still another possible implementation, the processing module 701 is configured to determine first transmit power of N random access preambles to be sent to a network device, where the first transmit power is determined based on preamble received target power, the preamble received target power is related to two adjacent random access types, and N is an integer greater than 1; and the transceiver module 702 is configured to send the N random access preambles to the network device at the first transmit power.

All related content of the steps in the foregoing method embodiments may be cited in function descriptions of corresponding function modules. Details are not described herein again.

In this embodiment, the communication apparatus 70 is presented in a form of function modules obtained through division in an integrated manner. The "module" herein may be a specific ASIC, a circuit, a processor executing one or more software or firmware programs, a memory, an integrated logic circuit, and/or another component that can provide the foregoing functions.

In a simple embodiment, a person skilled in the art may figure out that the communication apparatus 70 may be in a form of the terminal device 50 shown in FIG. 4.

For example, the processor 501 in the terminal device 50 shown in FIG. 4 may invoke the computer-executable instructions stored in the memory 502, to enable the terminal device 50 to perform the random access method in the foregoing method embodiments. Specifically, functions/implementation processes of the transceiver module 702 and the processing module 701 in FIG. 7 may be implemented by the processor 501 in the terminal device 50 shown in FIG. 4 by invoking the computer-executable instructions stored in the memory 502. Alternatively, a function/an implementation process of the processing module 701 in FIG. 7 may be implemented by the processor 501 in the terminal device 50 shown in FIG. 4 by invoking the computer-executable instructions stored in the memory 502, and a function/an implementation process of the transceiver module 702 in FIG. 7 may be implemented through the transceiver 503 in the terminal device 50 shown in FIG. 4.

The communication apparatus 70 provided in this embodiment may perform the power determining method. Therefore, for technical effects that can be achieved by the communication apparatus 70, refer to the foregoing method embodiments. Details are not described herein again.

It should be noted that one or more of the foregoing modules or units may be implemented by using software, hardware, or a combination thereof. When any one of the foregoing modules or units is implemented by software, the software exists in a form of computer program instructions, and is stored in the memory. The processor may be configured to execute the program instructions and implement the foregoing method procedure. The processor may be built into a system-on-a-chip (SoC) or an ASIC, or may be an independent semiconductor chip. In addition to a core for executing software instructions to perform operations or processing, the processor may further include a necessary hardware accelerator, for example, a field programmable gate array (FPGA), a programmable logic device (PLD), or a logic circuit that implements a special-purpose logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a chip system, including at least one processor and an interface. The at least one processor is coupled to a memory through the interface. When the at least one processor executes a computer program or instructions in the memory, the method in any one of the foregoing method embodiments is performed. In a possible implementation, the communication apparatus further includes a memory. Optionally, the chip system may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that the measures cannot be combined to produce a good effect.

Although this application is described with reference to specific features and the embodiments thereof, it is clear that various modifications and combinations may be made to them without departing from the scope of this application. Correspondingly, the specification and accompanying drawings are merely example descriptions of this application defined by the appended claims, and are considered as any of and all modifications, variations, combinations or equivalents that cover the scope of this application. Clearly, a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A power determining method, wherein the method comprises:
   determining a first transmit power of N random access preambles to be sent to a network device, wherein the first transmit power is based on the quantity N of the random-access preambles, and N is an integer greater than 1; and sending the N random access preambles to the network device at the first transmit power, wherein the first transmit power satisfies one of the following relationships:

$$P_{PRACH,b,f,c}(i)=\min\{P_{CMAX,f,c}(i), P_{PRACH,target,f,c}+\Delta(N)+PL_{b,f,c}\} \text{ [dBm]}, \text{ wherein}$$

$P_{PRACH,b,f,c}(i)$ represents the transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; $\Delta(N)$ represents a power offset, and $P_{PRACH,target,f,c}$ satisfies the following relationship:

$$P_{RACH,target,f,c}=\text{preambleReceivedTargetPower}+\text{DELTA\_PREAMBLE}+(\text{PREAMBLE\_POWER\_RAMPING\_COUNTER}-1)\times\text{PREAMBLE\_POWER\_RAMPING\_STEP}+\text{POWER\_OFFSET\_2STEP\_RA, wherein}$$

preambleReceivedTargetPower represents initial preamble received target power;

DELTA_PREAMBLE represents a power offset corresponding to a random-access preamble format;

PREAMBLE_POWER_RAMPING_COUNTER represents a quantity of preamble power ramping times;

PREAMBLE_POWER_RAMPING_STEP represents a preamble power ramping step; and

POWER_OFFSET_2STEP_RA represents a power difference between two-step random access and four-step random access, or $$P_{PRACH,b,f,c}(i)=\min\{P_{CMAX,f,c}(i), P_{PRACH,target,f,c}+PL_{b,f,c}\} \text{ [dBm]}, \text{ wherein}$$

$P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship:

$$P_{RACH,target,f,c}=\text{preambleReceivedTargetPower}+\Delta(N)+\text{DELTA\_PREAMBLE}+(\text{PREAMBLE\_POWER\_RAMPING\_COUNTER}-1)\times\text{PREAMBLE\_POWER\_RAMPING\_STEP}+\text{POWER\_OFFSET\_2STEP\_RA, wherein}$$

preamble ReceivedTargetPower represents initial preamble received target power;

DELTA_PREAMBLE represents a power offset corresponding to a random-access preamble format;

PREAMBLE_POWER_RAMPING_COUNTER represents a quantity of preamble power ramping times;

PREAMBLE_POWER_RAMPING_STEP represents a preamble power ramping step;

$\Delta(N)$ represents a power offset; and POWER_OFFSET_2STEP_RA represents a power difference between two-step random access and four-step random access, or $$P_{PRACH,b,f,c}(i)=\min\{P_{CMAX,f,c}(i), P_{PRACH,target,f,c}+PL_{b,f,c}\} \text{ [dBm]}, \text{ wherein}$$

$P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship:

$$P_{RACH,target,f,c}=\text{preambleReceivedTargetPower}+\text{DELTA\_PREAMBLE}+(\text{PREAMBLE\_POWER\_RAMPING\_COUNTER}-1)\times\text{PREAMBLE\_POWER\_RAMPING\_STEP}+\text{POWER\_OFFSET\_2STEP\_RA, wherein}$$

preamble ReceivedTargetPower represents initial preamble received target power;

DELTA_PREAMBLE represents a power offset corresponding to a random-access preamble format;

PREAMBLE_POWER_RAMPING_COUNTER represents a quantity of preamble power ramping times;

PREAMBLE_POWER_RAMPING_STEP represents a preamble power ramping step;

POWER_OFFSET_2STEP_RA represents a power difference between two-step random access and four-step random access; and DELTA_PREAMBLE is determined based on $\Delta(N)$, and $\Delta(N)$ represents a power offset.

2. The method according to claim 1, wherein that the first transmit power is based on the quantity N of the random-access preambles comprises:

the first transmit power is determined based on the power offset $\Delta(N)$ determined based on the quantity N of the random-access preambles.

3. The method according to claim 2, wherein the power offset $\Delta(N)$ satisfies the following relationship:

$\Delta(N)=10\log_{10}(N)$, where $\log_{10}(N)$ represents a logarithm of $N$ to base 10;

$\Delta(N)=\lfloor 10\log_{10}(N) \rfloor$, where $\lfloor\ \rfloor$ represents rounding down;

$\Delta(N)=\lceil 10\log_{10}(N) \rceil$, where $\lceil\ \rceil$ represents rounding up;

$\Delta(N)=\text{round}(10\log_{10}(N))$, where round represents rounding off;

$\Delta(N)=-10\log_{10}(N)$;

$\Delta(N)=-\lfloor 10\log_{10}(N) \rfloor$, where $\lfloor\ \rfloor$ represents rounding down;

$\Delta(N)=-\lceil 10\log_{10}(N) \rceil$, where $\lceil\ \rceil$ represents rounding up; or $\Delta(N)=-\text{round}(10\log_{10}(N))$, where round represents rounding off.

4. The method according to claim 1, wherein the first transmit power determined based on a sending manner of the N random access preambles.

5. The method according to claim 4, wherein the sending manner of the N random access preambles comprises:

the N random access preambles correspond to a same random access channel occasion (RO);

the N random access preambles correspond to a same random access time domain resource and different random access frequency domain resources; or the N random access preambles correspond to different random access time domain resources.

6. A power determining method, wherein the method comprises:

determining a first transmit power of N random access preambles to be sent to a network device, wherein the first transmit power is based on a transmit power parameter corresponding to the N random access preambles, and N is an integer greater than 1;

sending the N random access preambles to the network device at the first transmit power multiple times, wherein:

each time the N random access preambles are sent, a quantity of preamble power ramping times corresponding to the N random access preambles is increased by X1, wherein X1 is a positive integer greater than 1; or the quantity of preamble power ramping times corresponding to the N random access preambles is determined based on a sending manner of the N random access preambles.

7. The method according to claim 6, wherein the transmit power parameter corresponding to the N random access preambles comprises at least one of the following:

the quantity of preamble power ramping times corresponding to the N random access preambles;

a quantity of preamble transmission times corresponding to the N random access preambles;

initial preamble received target power corresponding to the N random access preambles;

a preamble power ramping step corresponding to the N random access preambles; or a difference between a power ramping step corresponding to the N random access preambles and a power ramping step corresponding to a single random-access preamble.

8. The method according to claim 6, wherein that the quantity of preamble power ramping times corresponding to the N random access preambles is determined based on the sending manner of the N random access preambles comprises:

each time the N random access preambles are sent in a first manner, the quantity of preamble power ramping times corresponding to the N random access preambles is increased by X2; and each time the N random access preambles are sent in a second manner, the quantity of preamble power ramping times corresponding to the N random access preambles is increased by 1, wherein X2 is a positive integer greater than 1.

9. The method according to claim 8, wherein the first manner comprises: the N random access preambles correspond to a same random access channel occasion (RO); or the N random access preambles correspond to a same random access time domain resource and different random access frequency domain resources; and the second manner comprises: the N random access preambles correspond to different random access time domain resources; or the first manner comprises: the N random access preambles correspond to different random access time domain resources; and the second manner comprises: the N random access preambles correspond to a same RO; or the N random access preambles correspond to a same random access time domain resource and different random access frequency domain resources.

10. The method according to claim 6, wherein the first transmit power is determined based on the sending manner of the N random access preambles.

11. The method according to claim 6, wherein the sending manner of the N random access preambles comprises:

the N random access preambles correspond to the same RO;

the N random access preambles correspond to the same random access time domain resource and the different random access frequency domain resources; or the N random access preambles correspond to the different random access time domain resources.

12. A communication apparatus, wherein the communication apparatus comprises a processor and a transceiver;

the processor is configured to determine first transmit power of N random access preambles to be sent to a network device, wherein the first transmit power is based on the quantity N of the random-access preambles, and N is an integer greater than 1; and the transceiver is configured to send the N random access preambles to the network device at the first transmit power;

wherein the first transmit power satisfies one of the following relationships:

$$P_{PRACH,b,f,c}(i) = \min\{P_{CMAX,f,c}(i), P_{PRACH,target,f,c} + \Delta(N) + PL_{b,f,c}\} \text{ [dBm]}, \text{ wherein}$$

$P_{PRACH,b,f,c}(i)$ represents the transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; $\Delta(N)$ represents a power offset, and $P_{PRACH,target,f,c}$ satisfies the following relationship:

$$P_{RACH,target,f,c} = \text{preambleReceivedTargetPower} + \text{DELTA\_PREAMBLE} + (\text{PREAMBLE\_POWER\_RAMPING\_COUNTER} - 1) \times \text{PREAMBLE\_POWER\_RAMPING\_STEP} + \text{POWER\_OFFSET\_2STEP\_RA}, \text{ wherein}$$

preambleReceivedTargetPower represents initial preamble received target power;

DELTA_PREAMBLE represents a power offset corresponding to a random-access preamble format;

PREAMBLE_POWER_RAMPING_COUNTER represents a quantity of preamble power ramping times;

PREAMBLE_POWER_RAMPING_STEP represents a preamble power ramping step; and

POWER_OFFSET_2STEP_RA represents a power difference between two-step random access and four-step random access, or $$P_{PRACH,b,f,c}(i) = \min\{P_{CMAX,f,c}(i), P_{PRACH,target,f,c} + PL_{b,f,c}\} \text{ [dBm]}, \text{ wherein}$$

$P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship:

$$P_{RACH,target,f,c} = \text{preambleReceivedTargetPower} + \Delta(N) + \text{DELTA\_PREAMBLE} + (\text{PREAMBLE\_POWER\_RAMPING\_COUNTER} - 1) \times \text{PREAMBLE\_POWER\_RAMPING\_STEP} + \text{POWER\_OFFSET\_2STEP\_RA}, \text{ wherein}$$

preamble ReceivedTargetPower represents initial preamble received target power;

DELTA_PREAMBLE represents a power offset corresponding to a random-access preamble format;

PREAMBLE_POWER_RAMPING_COUNTER represents a quantity of preamble power ramping times;

PREAMBLE_POWER_RAMPING_STEP represents a preamble power ramping step;

$\Delta(N)$ represents a power offset; and

POWER_OFFSET_2STEP_RA represents a power difference between two-step random access and four-step random access, or $$P_{PRACH,b,f,c}(i) = \min\{P_{CMAX,f,c}(i), P_{PRACH,target,f,c} + PL_{b,f,c}\} \text{ [dBm], wherein}$$

$P_{PRACH,b,f,c}(i)$ represents the first transmit power; $P_{CMAX,f,c}(i)$ represents maximum transmit power allowed by the terminal device; $P_{PRACH,target,f,c}$ represents preamble received target power; $PL_{b,f,c}$ represents a path loss estimated by the terminal device; and $P_{PRACH,target,f,c}$ satisfies the following relationship:

$$P_{RACH,target,f,c} = \text{preambleReceivedTargetPower} + \text{DELTA\_PREAMBLE} + (\text{PREAMBLE\_POWER\_RAMPING\_COUNTER} - 1) \times \text{PREAMBLE\_POWER\_RAMPING\_STEP} + \text{POWER\_OFFSET\_2STEP\_RA, wherein}$$

preamble ReceivedTargetPower represents initial preamble received target power;
DELTA_PREAMBLE represents a power offset corresponding to a random-access preamble format;
PREAMBLE_POWER_RAMPING_COUNTER represents a quantity of preamble power ramping times;
PREAMBLE_POWER_RAMPING_STEP represents a preamble power ramping step;
POWER_OFFSET_2STEP_RA represents a power difference between two-step random access and four-step random access; and DELTA_PREAMBLE is determined based on $\Delta(N)$, and $\Delta(N)$ represents a power offset.

13. The communication apparatus according to claim 12, wherein that the first transmit power is determined based on the quantity N of the random-access preambles comprises:
the first transmit power is determined based on the power offset $\Delta(N)$ determined based on the quantity N of the random-access preambles.

14. The communication apparatus according to claim 13, wherein the first transmit power satisfies the following relationship:

$$P_{PRACH,b,f,c}(i) = \min\{P_{CMAX,f,c}(i), P_{PRACH,target,f,c} + PL_{b,f,c}\} \text{ [dBm], wherein}$$

$P_{PRACH,b,f,c}(i)$ represents the first transmit power; $P_{CMAX,f,c}(i)$ represents maximum transmit power allowed by the communication apparatus; $P_{PRACH,target,f,c}$ represents preamble received target power; $PL_{b,f,c}$ represents a path loss estimated by the communication apparatus; and $P_{PRACH,target,f,c}$ satisfies the following relationship:

$$P_{RACH,target,f,c} = \text{preambleReceivedTargetPower} + \text{DELTA\_PREAMBLE} + (\text{PREAMBLE\_POWER\_RAMPING\_COUNTER} - 1) \times \text{PREAMBLE\_POWER\_RAMPING\_STEP} + \text{POWER\_OFFSET\_2STEP\_RA, wherein}$$

preamble ReceivedTargetPower represents initial preamble received target power; DELTA_PREAMBLE represents a power offset corresponding to a random-access preamble format; PREAMBLE_POWER_RAMPING_COUNTER represents a quantity of preamble power ramping times; PREAMBLE_POWER_RAMPING_STEP represents a preamble power ramping step; POWER_OFFSET_2STEP_RA represents a power difference between two-step random access and four-step random access; and DELTA_PREAMBLE is determined based on $\Delta(N)$, wherein the power offset $\Delta(N)$ satisfies the following relationship:

$\Delta(N) = 10 \log_{10}(N)$, where $\log_{10}(N)$ represents a logarithm of $N$ to base 10;

$\Delta(N) = \lfloor 10 \log_{10}(N) \rfloor$, where $\lfloor \ \rfloor$ represents rounding down;

$\Delta(N) = \lceil 10 \log_{10}(N) \rceil$, where $\lceil \ \rceil$ represents rounding up;

$\Delta(N) = \text{round}(10 \log_{10}(N))$, where round represents rounding off;

$\Delta(N) = -10 \log_{10}(N)$;

$\Delta(N) = -\lfloor 10 \log_{10}(N) \rfloor$, where $\lfloor \ \rfloor$ represents rounding down;

$\Delta(N) = -\lceil 10 \log_{10}(N) \rceil$, where $\lceil \ \rceil$ represents rounding up; or $\Delta(N) = -\text{round}(10 \log_{10}(N))$, where round represents rounding off.

\* \* \* \* \*